(12) United States Patent
Takayama et al.

(10) Patent No.: US 8,734,984 B2
(45) Date of Patent: May 27, 2014

(54) BIPOLAR BATTERY MANUFACTURING METHOD, AND BIPOLAR BATTERY

(75) Inventors: Gen Takayama, Yokohama (JP); Kenji Hosaka, Yokosuka (JP); Teruo Segawa, Ayase (JP); Hajime Satou, Ebina (JP); Hideaki Horie, Yokosuka (JP); Takahiro Iwasaki, Isehara (JP); Yoshio Shimoida, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 747 days.

(21) Appl. No.: 12/734,311

(22) PCT Filed: Oct. 20, 2008

(86) PCT No.: PCT/JP2008/068936
§ 371 (c)(1),
(2), (4) Date: Apr. 23, 2010

(87) PCT Pub. No.: WO2009/054334
PCT Pub. Date: Apr. 30, 2009

(65) Prior Publication Data
US 2010/0255371 A1    Oct. 7, 2010

(30) Foreign Application Priority Data

Oct. 25, 2007  (JP) ................................. 2007-278038
Feb. 22, 2008  (JP) ................................. 2008-041682
Sep. 16, 2008  (JP) ................................. 2008-236820

(51) Int. Cl.
*H01M 10/18*  (2006.01)
*B32B 37/00*  (2006.01)
*B32B 37/12*  (2006.01)
*B32B 37/06*  (2006.01)

(52) U.S. Cl.
USPC ........... 429/210; 429/129; 429/135; 429/141; 429/188; 29/623.1; 29/623.2; 29/623.5

(58) Field of Classification Search
USPC .......................... 429/129, 135, 141, 188, 210; 29/623.1–623.5
See application file for complete search history.

(56) References Cited

U.S. PATENT DOCUMENTS

| | | | |
|---|---|---|---|
| 5,778,515 A * | 7/1998 | Menon | 29/623.4 |
| 7,445,869 B2 * | 11/2008 | Puester et al. | 429/185 |
| 8,076,021 B2 | 12/2011 | Shimamura et al. | |
| 8,415,049 B2 | 4/2013 | Shimamura et al. | |

(Continued)

FOREIGN PATENT DOCUMENTS

| | | | |
|---|---|---|---|
| JP | 9-232003 A | 9/1997 | |
| JP | 11-204136 A | 7/1999 | |

(Continued)

*Primary Examiner* — Ula C Ruddock
*Assistant Examiner* — Amanda Barrow
(74) *Attorney, Agent, or Firm* — Foley & Lardner LLP

(57) ABSTRACT

When a bipolar battery is manufactured, a bipolar electrode and a separator are prepared first. Then, one electrode (for example, a positive electrode) out of positive and negative electrodes is applied with such an amount of electrolyte as being exposed on a surface of the one electrode. Then, the separator is arranged on the surface of the one electrode applied with the electrolyte, thus forming a sub-assembly unit. Then, a plurality of the sub-assembly units are layered, and the electrolyte applied to the one electrode is made to permeate through the separator to the other electrode, thus forming an assembly unit.

14 Claims, 24 Drawing Sheets

(56) References Cited

U.S. PATENT DOCUMENTS

| | | | |
|---|---|---|---|
| 2003/0099884 A1* | 5/2003 | Chiang et al. | 429/233 |
| 2004/0161667 A1* | 8/2004 | Fukuzawa et al. | 429/210 |
| 2004/0253512 A1* | 12/2004 | Watanabe et al. | 429/210 |
| 2005/0081370 A1* | 4/2005 | Kurihara et al. | 29/623.3 |
| 2005/0260493 A1* | 11/2005 | Frederiksson et al. | 429/210 |
| 2007/0015047 A1* | 1/2007 | Hosaka et al. | 429/66 |
| 2007/0077485 A1* | 4/2007 | Takamura et al. | 429/82 |
| 2008/0131775 A1* | 6/2008 | Takayama et al. | 429/210 |
| 2008/0138706 A1* | 6/2008 | Takayama et al. | 429/210 |
| 2009/0253038 A1* | 10/2009 | Segawa et al. | 429/210 |

FOREIGN PATENT DOCUMENTS

| | | | | |
|---|---|---|---|---|
| JP | 2002-216846 A | 8/2002 | | |
| JP | 2002-216854 A | 8/2002 | | |
| JP | 2004-178914 A | 6/2004 | | |
| JP | 2005-317468 A | 11/2005 | | |
| JP | 2006-252882 A | 9/2006 | | |
| WO | WO 2006/062204 A1 | 6/2006 | | |
| WO | PCT/IB2007/003669 | * 11/2007 | | H01M 10/04 |

* cited by examiner

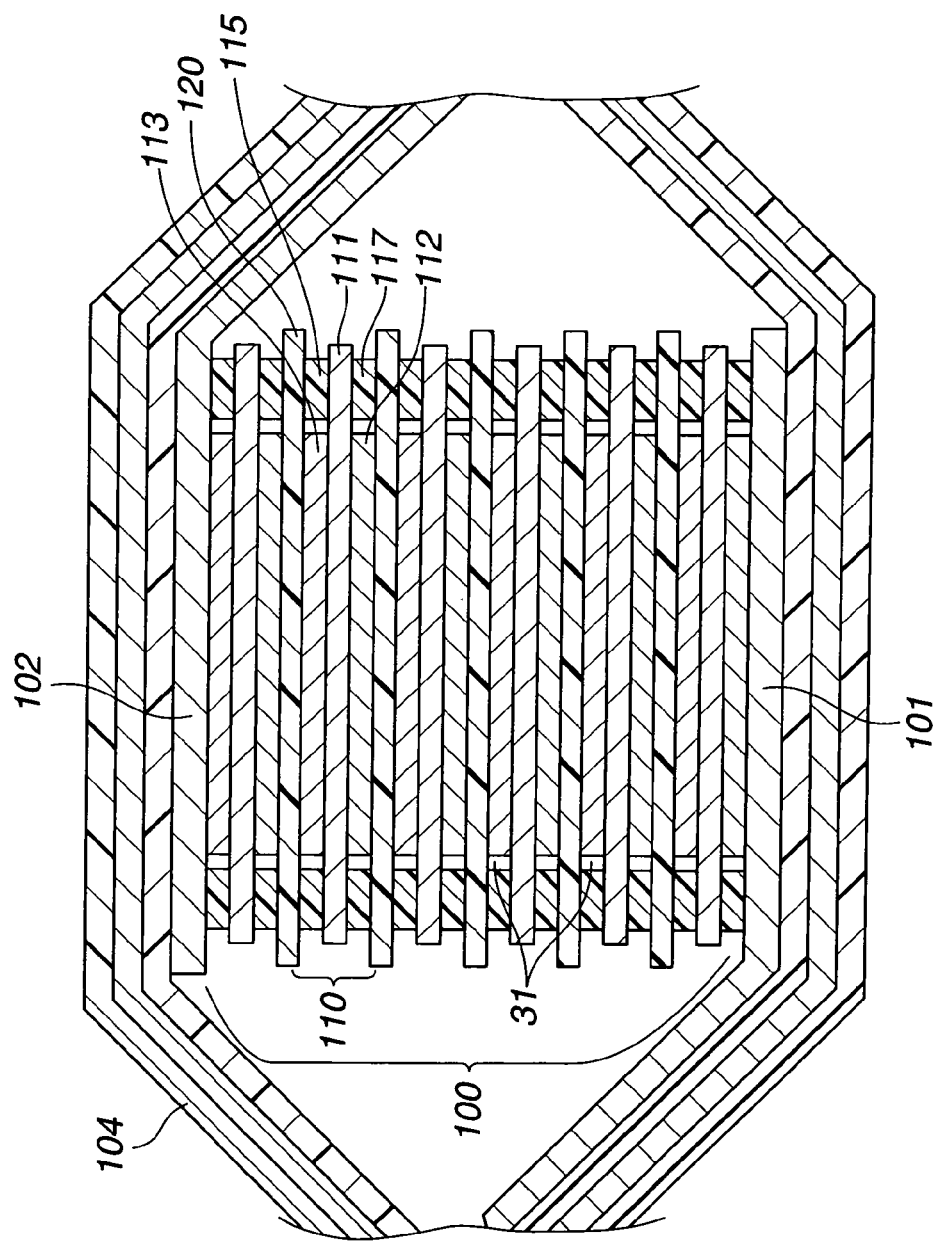

BIPOLAR BATTERY MANUFACTURING METHOD, AND BIPOLAR BATTERY

TECHNICAL FIELD

The present invention relates to bipolar battery manufacturing method, and bipolar battery.

BACKGROUND OF THE INVENTION

In recent years, it is greatly desired to reduce carbon dioxide emissions for environmental protection. In the motor vehicle industry, it is expected to reduce carbon dioxide emissions by introduction of electric vehicles, and hybrid electric vehicles. Attention is being focused on bipolar battery as a power supply for motor drive which is a key factor for commercialization.

A bipolar battery is manufactured by: providing an electrolyte layer to a bipolar electrode where a positive electrode is formed on a surface of a current collector, and a negative electrode is formed on another surface of the current collector; and forming a layered product by layering them (for example, see patent documents 1 and 2).

Patent Document 1: JP 11-204136 A
Patent Document 2: JP 9-232003 A

SUMMARY OF THE INVENTION

When a bipolar electrode is provided with an electrolyte layer, or when a layered product is formed by layering them, bubbles can be incorporated and remain in an electrolyte between a separator and a positive or negative electrode. The electrolyte layer includes a layer of a separator that is permeated by an electrolyte, and separates a positive electrode and a negative electrode from one another, and a layer of electrolyte between the separator and the positive or negative electrode.

If bubbles remain in a place, the place is provided with a dead space that allows no ion permeation and no electron movement. This can be a factor for output fall, and thereby is a problem for improvement in output density.

The present invention is made to solve the problem with the conventional technology described above, and has an object to provide a bipolar battery manufacturing method which is capable of manufacturing a bipolar battery superior in battery performance, and a bipolar battery superior in battery performance, by enhancing the output density by suppressing incorporation of bubbles.

In a bipolar battery manufacturing method according to the present invention for achieving the object described above, first, a bipolar electrode is prepared where a positive electrode is formed on a surface of a current collector, and a negative electrode is formed on another surface of the current collector; and a porous separator is prepared which is permeable by an electrolyte. Then, a sub-assembly unit is formed by layering the bipolar electrode, the separator, and the electrolyte so that the electrolyte is positioned at a first surface of the separator. Then, an assembly unit is formed by: layering a plurality of the sub-assembly units; and making the electrolyte permeate through the separator to one of the positive and negative electrodes that faces a second surface of the separator.

A bipolar battery according to the present invention for achieving the object described above, comprises: a bipolar electrode where a positive electrode is formed on a surface of a current collector, and a negative electrode is formed on another surface of the current collector; and an electrolyte layer disposed between the bipolar electrodes layered, the electrolyte layer including a porous separator that is permeable by an electrolyte, wherein the electrolyte layer includes: a first layer formed by layering the bipolar electrode, the separator, and the electrolyte so that the electrolyte is positioned at a first surface of the separator, the first layer containing an electrolyte that conducts ions between the separator and one of the positive and negative electrodes; a second layer formed by making the electrolyte positioned at the first surface permeate the separator; and a third layer formed by making the electrolyte positioned at the first surface permeate through the separator to another of the positive and negative electrodes that faces a second surface of the separator, the third layer containing an electrolyte that conducts ions between the separator and the other electrode.

BRIEF DESCRIPTION OF THE DRAWINGS

FIG. 2 is a sectional view showing a major part of the bipolar battery;

DETAILED DESCRIPTION

Figure 1:
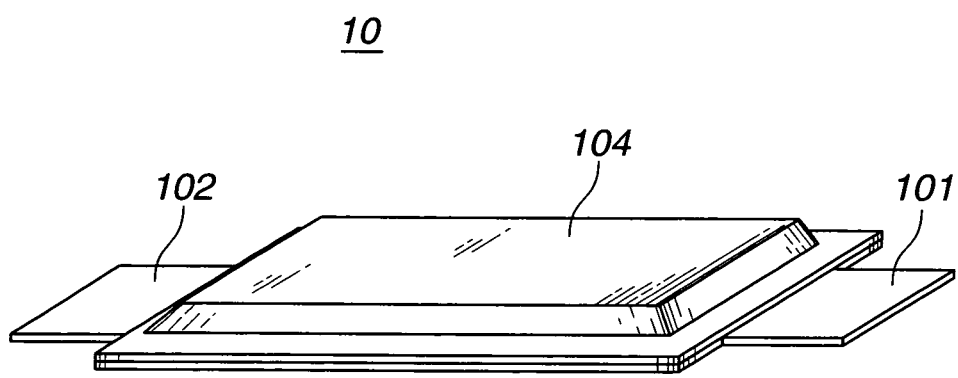
FIG. 1 is a perspective view showing a bipolar battery according to an embodiment.

The following describes embodiments of the present invention with reference to the drawings. In the drawings, each constituent is exaggerated for ease of understanding.

First Embodiment

Figure 3A:
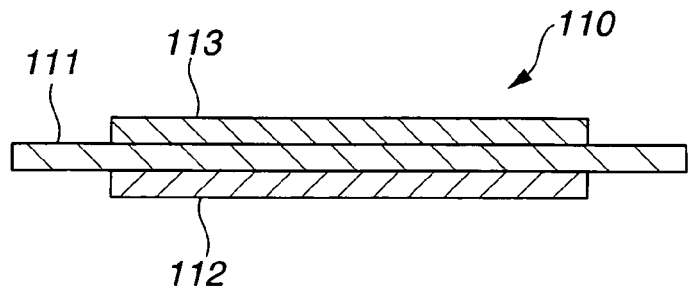
FIG. 3A is a sectional view showing a bipolar electrode.
Figure 3B:
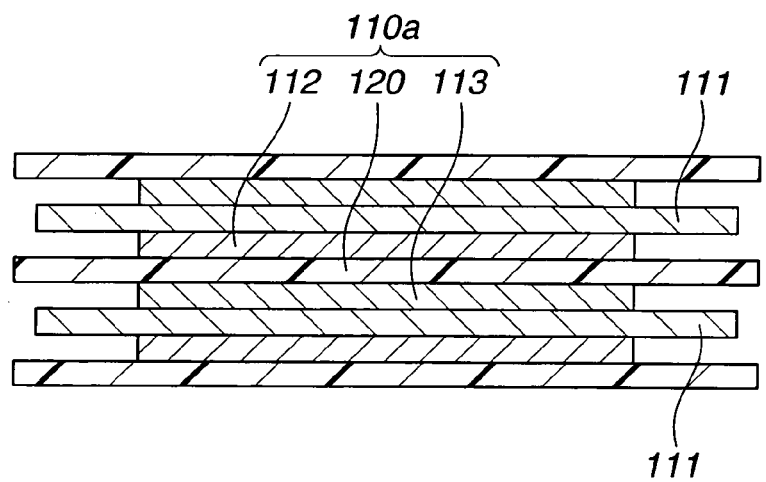
FIG. 3B is a sectional view for description of a cell layer.
Figure 4:
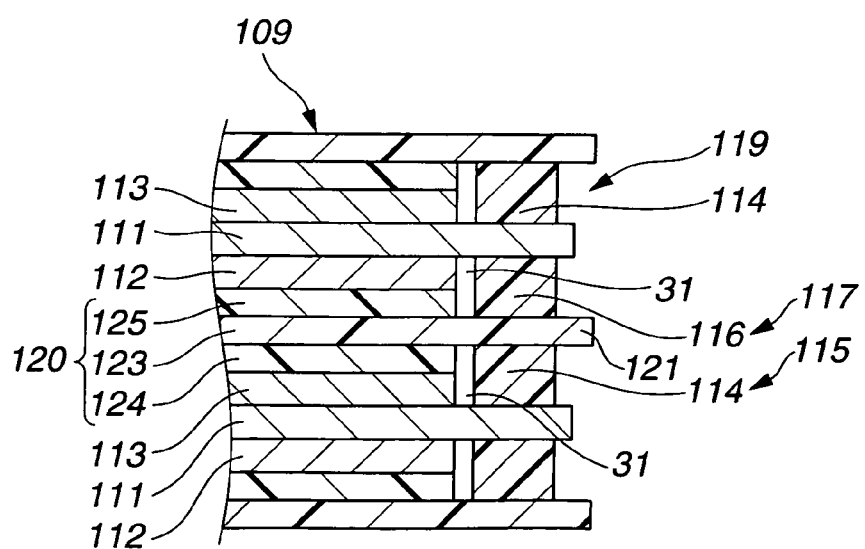
FIG. 4 is a sectional view for describing an assembly unit, an electrolyte layer, and a sealing part.
Figure 5A:
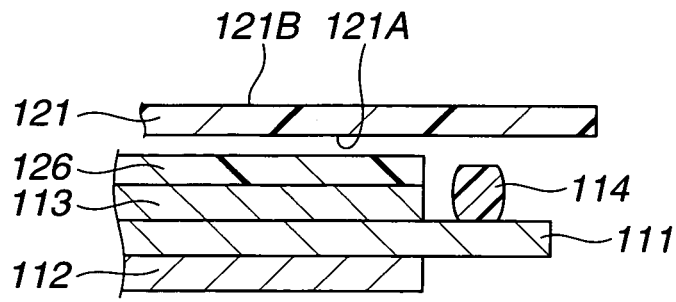
FIG. 5A is a sectional view for describing a sub-assembly unit, and first and second seals.
Figure 5B:
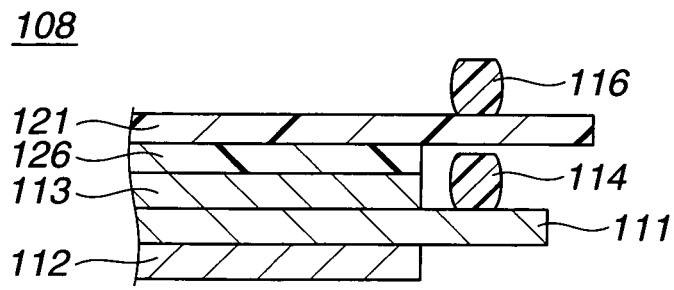
FIG. 5B is a sectional view for describing the sub-assembly unit, and first and second seals.
Figure 5C:
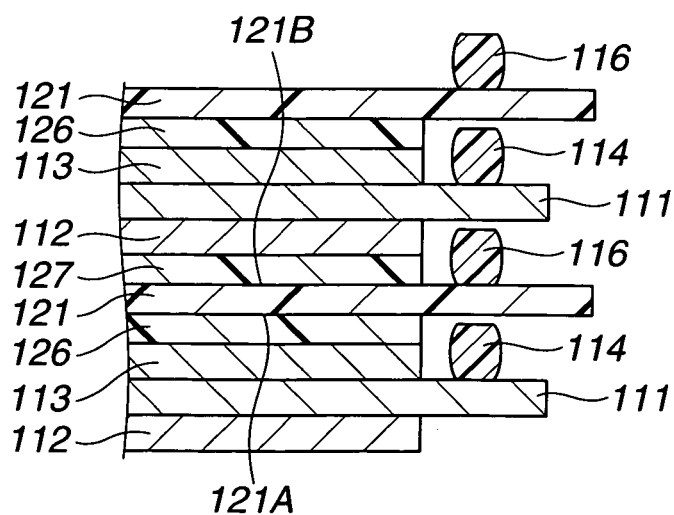
FIG. 5C is a sectional view showing a condition that sub-assembly units are layered together, and an electrolyte is made to permeate through a separator, and exposed on a surface of a negative electrode.
Figure 6:
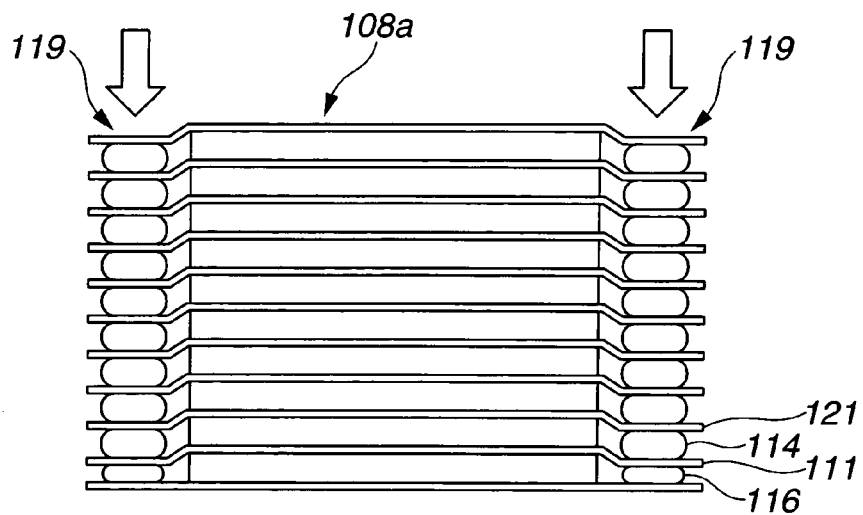
FIG. 6 is a sectional view showing a condition that the first and second seals are pressed to form the sealing part.
Figure 7A:
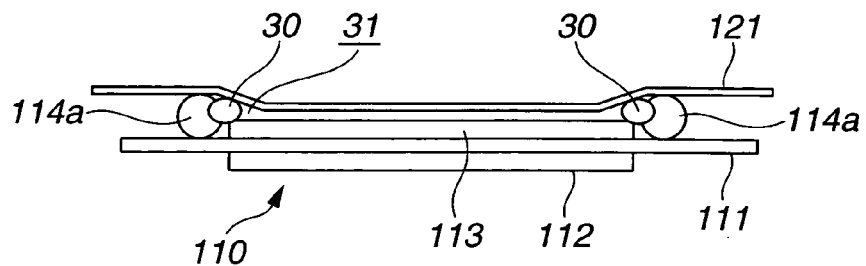
FIG. 7A is a sectional view showing a condition that bubbles are incorporated, when bipolar electrodes and separators are layered alternately.
Figure 7B:
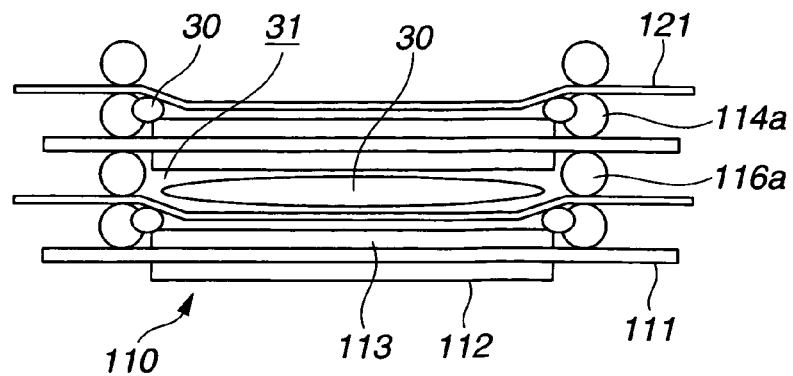
FIG. 7B is a sectional view showing a condition that bubbles are incorporated, when bipolar electrodes and separators are layered alternately.

FIG. 1 is a perspective view showing a bipolar battery 10 according to an embodiment. FIG. 2 is a sectional view showing a major part of bipolar battery 10. FIG. 3A is a sectional view showing a bipolar electrode 110. FIG. 3B is a sectional view for description of a cell layer 110a. FIG. 4 is a sectional view for describing an assembly unit 109, an electrolyte layer 120, and a sealing part 119. FIGS. 5A and 5B are sectional views for describing a sub-assembly unit 108, and first and second seals 114, 116. FIG. 5C is a sectional view showing a condition that sub-assembly units 108 are layered together, and an electrolyte 127 is made to permeate through a separator 121, and exposed on a surface of a negative electrode 112. FIG. 6 is a sectional view showing a condition that first and second seals 114, 116 are pressed to form sealing part 119. FIGS. 7A and 7B are sectional views showing a condition that bubbles are incorporated, when bipolar electrodes and separators are layered alternately.

Generally, bipolar battery 10 according to the present invention includes: bipolar electrode 110 where a positive electrode 113 is formed on a surface of a current collector 111, and a negative electrode 112 is formed on another surface of positive electrode 113; and an electrolyte layer 120 disposed between layered bipolar electrodes 110, wherein electrolyte layer 120 includes porous separator 121 that is permeable by an electrolyte (see FIGS. 3A, 3B and 4). Electrolyte layer 120 includes: a first layer 124 containing an electrolyte that conducts ions between separator 121 and one of positive electrode 113 and negative electrode 112; a second layer 123 where separator 121 is permeated by an electrolyte; and a third layer 125 containing an electrolyte that conducts ions between separator 121 and the other of positive electrode 113 and negative electrode 112. First layer 124 is formed by layering the bipolar electrode 110, separator 121, and the electrolyte under so that the electrolyte is positioned at a first surface 121A of separator 121. Second layer 123 is formed by making the electrolyte positioned at first surface 121A to permeate separator 121. Third layer 125 is formed by making the electrolyte positioned at first surface 121A to permeate through separator 121 to the other electrode that faces a second surface 121B of separator 121 (see FIGS. 5A and 5C). Electrolyte layer 120 functions well with formation of first to third layers 124, 123 and 125.

In manufacturing the bipolar battery 10, bipolar electrode 110 and separator 121 are prepared first. Next, sub-assembly unit 108 is formed by layering the bipolar electrode 110, separator 121, and an electrolyte 126 so that electrolyte 126 is positioned at first surface 121A of separator 121 (see FIG. 5B). Then, a plurality of sub-assembly units 108 are layered (see FIG. 5C), and electrolyte 126 is made to permeate through separator 121 to one of positive electrode 113 and negative electrode 112 that faces second surface 121B of separator 121, thus forming the assembly unit 109 (see FIG. 4). FIG. 5C shows a condition that sub-assembly units 108 are layered together, and an electrolyte 127 is made to permeate through separator 121, and exposed on a surface of negative electrode 112.

In an operation of forming the sub-assembly unit, the amount of electrolyte 126 is equal to the sum of the amount held by one of positive electrode 113 and negative electrode 112, the amount made to permeate separator 121, and the amount made to permeate through separator 121 to the other electrode. This is to allow electrolyte layer 120 to function well.

First surface 121A of separator 121 is a surface facing the bipolar electrode 110, or an outside surface opposite to the surface facing the bipolar electrode 110. Accordingly, the electrolyte is positioned between bipolar electrode 110 and separator 121, or at the outside surface of separator 121 layered on bipolar electrode 110.

In the first embodiment, first surface 121A of separator 121 is the surface facing the bipolar electrode 110, so that the electrolyte is positioned between bipolar electrode 110 and separator 121. Before separator 121 is layered on bipolar electrode 110, the electrolyte is applied to one of positive electrode 113 and negative electrode 112 on which separator 121 is layered (see FIG. 5A).

Accordingly, in electrolyte layer 120 according to the first embodiment, first layer 124 is formed by applying to one of positive electrode 113 and negative electrode 112 such an amount of electrolyte as being exposed on the surface of the one electrode. Second layer 123 is formed by making the electrode applied to the one electrode so that the electrode permeates separator 121. Third layer 125 is formed by making the electrolyte applied to the one electrode so that the electrolyte permeates through separator 121, and is exposed on the surface of the other electrode (see FIG. 4).

In manufacturing the bipolar battery 10 according to the first embodiment, bipolar electrode 110 and separator 121 are prepared first. Next, one of positive electrode 113 and negative electrode 112 is applied with such an amount of electrolyte 126 as being exposed on the surface of the one electrode (see FIG. 5A). Next, sub-assembly unit 108 is formed by layering separator 121 on the surface of the one electrode to which the electrolyte is applied (see FIG. 5B). Then, a plurality of sub-assembly units 108 are layered (see FIG. 5C), and electrolyte 126, which is applied to the one electrode, is made to permeate through separator 121 to the other electrode, thus forming the assembly unit 109 (see FIG. 4). FIG. 5C shows a condition that sub-assembly units 108 are layered together, and electrolyte 127 is made to permeate through separator 121, and exposed on the surface of negative electrode 112.

In the operation of forming the assembly unit 109, electrolyte layer 120 is formed which includes: first layer 124 containing an electrolyte that conducts ions between the one electrode and separator 121; second layer 123 in which separator 121 is permeated by an electrolyte; and third layer 125 containing an electrolyte that conducts ions between the other electrode and separator 121 (see FIG. 4).

In this embodiment, the electrolyte is applied to positive electrode 113 beforehand, and is made to permeate through separator 121 to negative electrode 112. Accordingly, positive electrode 113 corresponds to "one electrode", and negative electrode 112 corresponds to "other electrode". The electrolyte is in the form of liquid or semi-solid gel. In this embodiment, a high polymer gel electrolyte is used. The ratio between the polymer and electrolytic solution constituting the high polymer gel electrolyte is wide-ranging. Where containing 100% of the polymer indicates a full solid polyelectrolyte, and containing 100% of the electrolytic solution indicates a liquid electrolyte, every intermediate is a high polymer gel electrolyte. With a high polymer gel electrolyte, it is possible to suitably make the electrolyte to permeate through separator 121, as described in detail below.

As shown in FIGS. 1 and 2, in bipolar battery 10, a cell part 100 is arranged in an exterior case 104, for preventing externally inputted shocks and environmental degradation.

Referring to FIGS. 2 and 3A, in bipolar electrode 110, a positive active material layer is provided on one surface of current collector 111, thus forming the positive electrode 113, and a negative active material layer is provided on the other surface, thus forming the negative electrode 112. Referring to FIG. 3B, positive electrode 113, electrolyte layer 120, and negative electrode 112 form the cell layer 110a between a pair of adjacent current collectors 111. The number of layered cell layers 110a is determined depending on a requested voltage.

Current collector 111 is also referred to as ion division wall, because it allows electrons to pass through, but interrupts ions. Electrolyte layer 120 is also referred to as ion-permeable layer. As shown in FIG. 4, electrolyte layer 120 includes: second layer 123 in which separator 121 that separates positive electrode 113 from negative electrode 112 is permeated by an electrolyte; first layer 124 containing an electrolyte that conducts ions between separator 121 and positive electrode 113; and third layer 125 containing an electrolyte that conducts ions between separator 121 and negative electrode 112. Separator 121 is an insulator that separates positive electrode 113 from negative electrode 112, whereas ions and a current flow when the pores of separator 121 are permeated by an electrolyte.

Referring back to FIG. 2, a negative terminal plate 102 is arranged on the top of the uppermost bipolar electrode 110 in cell part 100, and a positive terminal plate 101 is arranged on the bottom of the lowermost bipolar electrode 110. Terminal plates 101, 102 are made of a high conductive material, covering at least the entire area of projection of the outside layers. This makes it possible to lower the resistance in taking out a surface direction current, and thereby enhance the output of the battery. The high conductive material is aluminum, copper, titan, nickel, stainless, or any alloy thereof.

The uppermost and lowermost of cell part 100 are not limited to bipolar electrode 110. A terminal electrode may be layered in which only a positive or negative active material layer is provided on one surface.

Bipolar battery 10 does not function as a battery, when the electrolyte contained in electrolyte layer 120 seeps out so that cell layers 110a are electrically connected to each other. This is called liquid junction. To prevent liquid junction, sealing part 119 is provided to prevent the electrolyte from leaking.

Referring to FIG. 4, sealing part 119 includes the form that the space between adjacent current collectors 111 is divided by separator 121 into two spaces, and first and second seals 114, 116 are arranged in corresponding ones of the divided spaces. First seal 114 is arranged in the space between separator 121 and current collector 111, surrounding the positive electrode 113. Second seal 116 is arranged in the space between separator 121 and current collector 111, surrounding the negative electrode 112. Accordingly, first seal 114 and second seal 116 are arranged in two layers, sandwiching the current collector 111, in the space between adjacent current collectors 111.

In the operation of forming the assembly unit 109, first and second seals 114, 116 are pressed in the direction in which sub-assembly units 108 are layered. This brings current collectors 111, separator 121, and first and second seals 114, 116 into tight contact, thus forming the sealing part 119. For convenience of description, the seal layer formed of first seal 114 is referred to as first seal layer 115, and the seal layer formed of second seal 116 is referred to as second seal layer 117 (see FIGS. 2 and 4).

First and second seals 114, 116 are one-component uncured epoxy resins, but not so limited. For example, first and second seals 114, 116 may be other thermosetting resins (polypropylene, polyethylene, etc.), or thermoplastic resins. It is preferable to suitably select according to applications one which provides a favorable sealing effect under a use environment.

FIGS. 7A and 7B show conditions that bubbles 30, which are air bubbles, are incorporated, when bipolar electrodes 110 and separators 121 are layered alternately. FIG. 7A shows a condition that when separator 121 is layered on top of bipolar electrode 110, bubbles 30 are incorporated close to a seal 114a in an internal space 31, because seal 114a is thicker than the thickness of positive electrode 113. FIG. 7B shows a condition that when a seal 116a is arranged on top of separator 121 shown in FIG. 7A, and bipolar electrode 110 is layered, so that bubbles 30 are incorporated in internal space 31 between the upper bipolar electrode 110 and the lower separator 121.

As described above, if air remains in the form of bubbles 30, it can be a factor for lowering the output of the battery. Accordingly, during layering, an operation of removing bubbles is performed, for example, by squeezing bubbles from separator 121. In order to eliminate such a troublesome operation, and simplify the manufacturing the bipolar battery 10, it is important to suppress the incorporation of gas 30 when bipolar electrode 110 is layered.

Accordingly, as shown in FIGS. 5A and 5B, in bipolar battery 10, in the operation of forming the sub-assembly unit 108, the thickness of first seal 114 arranged on top of current collector 111 is set below the sum of the thickness of positive electrode 113 and the thickness of electrolyte 126 exposed on the surface of positive electrode 113. Moreover, the thickness of second seal 116 arranged on top of separator 121 is set below the sum of the thickness of negative electrode 112 and the thickness of electrolyte 127 made to permeate through separator 121, and exposed on the surface of negative electrode 112. This size setting forms a clearance between separator 121 and first seal 114, when separator 121 is arranged. This suppresses the incorporation of bubbles in the internal space surrounded by first seal 114 (see FIGS. 5A and 5B). When separator 121 is arranged, air can be incorporated between separator 121 and electrolyte 126, but the air passes through permeable separator 121 itself, so that it does not remain in the form of bubbles.

Moreover, when sub-assembly units 108 are layered together, and electrolyte 127 is made to permeate through separator 121 and exposed on the surface of negative electrode 112, a clearance is formed between current collector 111 and second seal 116. This suppresses the incorporation of bubbles in the internal space surrounded by second seal 116 (see FIG. 5C).

In this way, when bipolar electrode 110 is layered, the incorporation of bubbles 30 is suppressed, so that it becomes unnecessary to remove bubbles, for example, by squeezing from separator 121, during layering. This eliminates such a troublesome operation, and serves for mass production of bipolar battery 10.

Incidentally, the amount of electrolyte 126 exposed on the surface of positive electrode 113 includes an amount for forming the first layer 124, an amount made to permeate separator 121, and an amount made to permeate through separator 121 to negative electrode 112. For this reason, the thickness of electrolyte 126 is larger than that of first layer 124. The amount of electrolyte 127 exposed on the surface of negative electrode 112 includes an amount for forming the third layer 125, and an amount made to permeate negative electrode 112. For this reason, the thickness of electrolyte 127 is larger than that of third layer 125, until negative electrode 112 is permeated adequately and uniformly by the electrolyte.

By layering the sub-assembly units 108, first and second seals 114, 116 are arranged to surround positive electrode 113 and negative electrode 112 in the space between current collector 111 and electrolyte layer 120.

Even if layered product 108a of sub-assembly units 108 is pressed flatly, the pressure is not fully applied to the place where first and second seals 114, 116 are arranged. This may cause inadequate sealing. Accordingly, in the operation of forming the assembly unit 109, first and second seals 114, 116 are pressed in the direction in which sub-assembly unit 108 are layered, so as to bring current collector 111, separator 121, and first and second seals 114, 116 into tight contact, thus forming the sealing part 119 (see FIG. 6).

The construction of bipolar battery 10 is not specifically limited, but may be implemented by materials commonly known and used in common lithium ion batteries, except those specified. The following describes the current collector 111, negative active material layer, positive active material layer, separator 121, electrolyte, and others which can be used in bipolar battery 10, for reference.

Current collector 111 is, for example, a stainless steel foil, but not so limited. Current collector 111 may be made of an aluminum foil, a crude material of nickel and aluminum, a crud material of copper and aluminum, or a plated material of their combination.

The negative active material for negative electrode 112 is, for example, a hard carbon (non-graphitizable carbon material), but not so limited. It may be a graphitic carbon material, or a composite oxide of lithium and a transition metal. Especially, it is preferable that the negative active material is made of carbon and a composite oxide of lithium and a transition metal, in view of the capacity and output characteristics.

The positive active material for positive electrode 113 is, for example, a lithium-manganese composite oxide such as $LiMn_2O_4$, a lithium-nickel composite oxide such as $LiNiO_2$, or a lithium-cobalt composite oxide such as $LiCoO_2$, but not so limited. It is preferable to use a composite oxide of lithium and a transition metal, in view of the capacity and output characteristics.

The thicknesses of positive electrode 113 and negative electrode 112 are not specifically limited, but set in consideration of objects of the battery (weighting the output, or weighting the energy, for example), and ion conductivity.

First and second seals 114, 116, which constitute first and second seal layers 115, 117, are, for example, one-component uncured epoxy resins, but not so limited. First and second seals 114, 116 may be other thermosetting resins (polypropylene, polyethylene, etc.), or thermoplastic resins. It is preferable to suitably select according to applications one which provides a favorable sealing effect under a use environment.

Separator 121, which is a part of electrolyte layer 120, is made of a material such as porous PE (polyethylene) that is electrolyte-permeable, but not so limited. Separator 121 may be made of another polyolefin such as PP (polypropylene), a layered material having three layers of PP/PE/PP, polyamide, polyimide, aramid, and a nonwoven fabric made of cotton, rayon, acetate, nylon, polyester, or aramid, for example. It is preferable that the diameter of the largest micropore of the separator is below 1 μm (normally about several tens of nm).

The host polymer of the electrolyte is, for example, PVDF—HFP (a copolymer of polyvinylidene fluoride and hexafluoropropylene) containing 10% of a copolymer of HEP (hexafluoropropylene), but not so limited. It may be another high polymer having no lithium ion conductivity such as PAN (polyacrylonitrile) or PMMA (polymethyl methacrylate), or a high polymer having ion conductivity (solid high polymer electrolyte) such as PEO (polyethylene oxide) or PPO (polypropylene oxide).

The electrolytic solution held by the host polymer includes an organic solvent composed of PC (propylene carbonate) and EC (ethylene carbonate), and a lithium salt (LiPF$_6$) as a supporting salt, for example. The organic solvent is not limited to PC and EC, but may be another cyclic carbonate, a chain carbonate such as dimethyl carbonate, or an ether such as tetrahydrofuran. The lithium salt is not limited to LiPF$_6$, but may be another inorganic acid anionic salt, or an organic acid anionic salt such as LiCF$_3$SO$_3$.

As shown in FIGS. 1 and 2, cell part 100 is housed in the form of the layered product of cell layers 110a in exterior case 104. Current collectors 111 located in the most outside layers of cell part 100 are connected to terminal leads 101, 102 which are made of a high conductive material. The high conductive material is, for example, aluminum, copper, titan, nickel, stainless, or any alloy thereof.

Terminal plate 101, 102 extends out of exterior case 104, and serves as an electrode tab through which a current is taken out from cell part 100. It is also possible to take out a current from cell part 100 by arranging independent electrode tabs, and connecting the same to terminal plates 101, 102 directly or through leads.

Exterior case 104 is made of a sheet material such as a composite laminate film of a high polymer and a metal in which a metal (including an alloy) such as aluminum, stainless, nickel, or copper is coated with an insulator such as a polypropylene film, in consideration of weight reduction and thermal conductivity. All or part of the periphery of the sheet material is spliced by fusion splice, so that exterior case 104 encloses the cell part 100.

The following describes a manufacturing method for bipolar battery 10.

Figure 8:
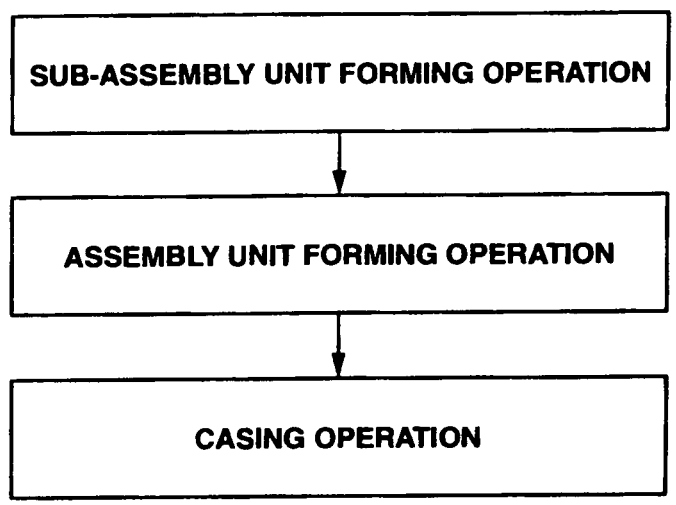
FIG. 8 is an entire flow chart for describing a manufacturing method for the bipolar battery according to the embodiment.

FIG. 8 is an entire flow chart for describing a manufacturing method for bipolar battery 10 according to the embodiment.

The manufacturing method for bipolar battery 10 according to the embodiment includes: a sub-assembly unit forming operation of forming the sub-assembly unit 108 which is formed by providing the bipolar electrode 110 with separator 121; an assembly unit forming operation of forming the assembly unit 109 which is formed by layering and integrating a plurality of sub-assembly units 108; and a casing operation of housing the assembly unit 109 in exterior case 104.

Figure 9:
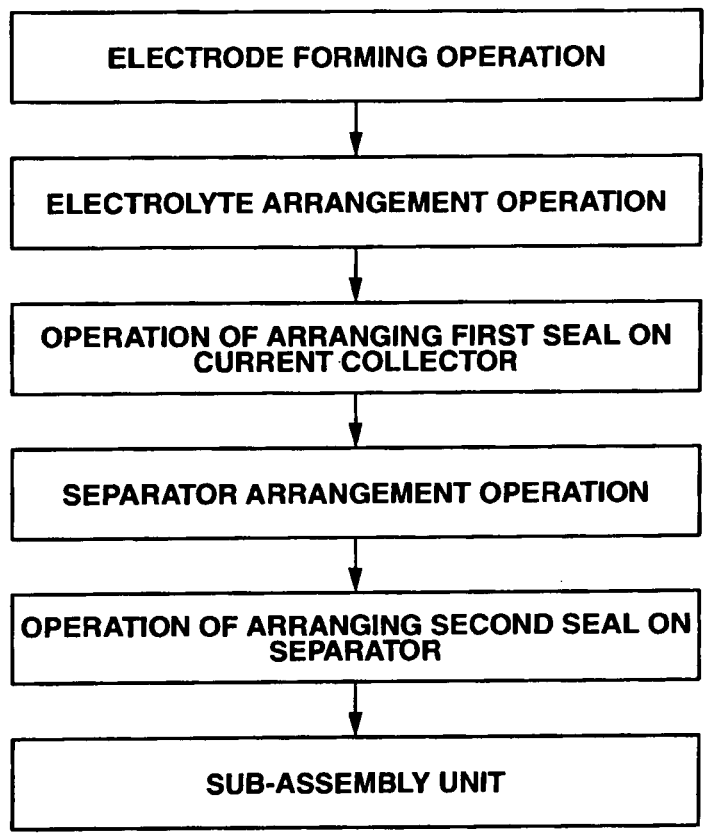
FIG. 9 is a flow chart for describing a sub-assembly unit forming operation shown in FIG. 8.
Figure 10:
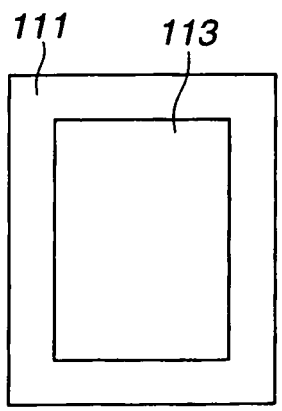
FIG. 10 is a plan view for describing an electrode forming operation shown in FIG. 9.
Figure 11:
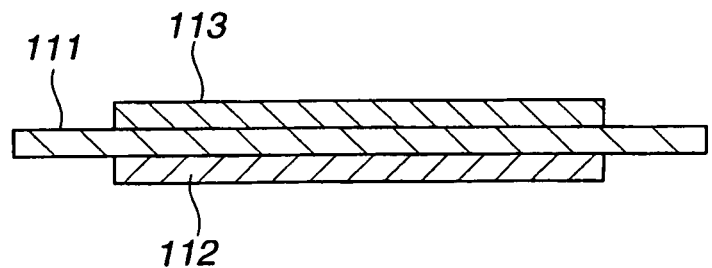
FIG. 11 is a sectional view for describing the electrode forming operation shown in FIG. 9.
Figure 12:
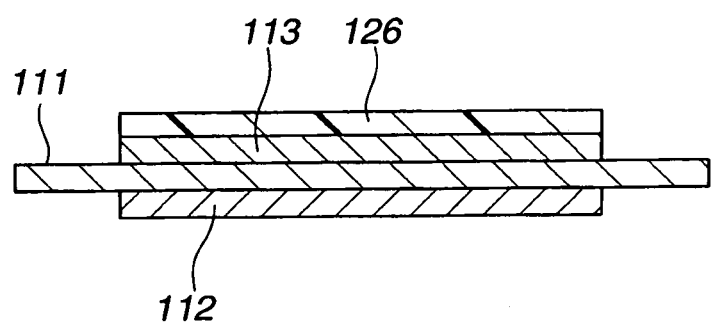
FIG. 12 is a sectional view for describing an electrolyte arrangement operation shown in FIG. 9.
Figure 13:
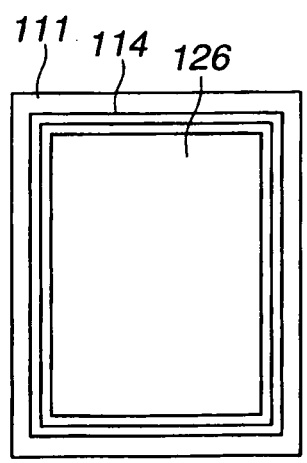
FIG. 13 is a plan view for describing an operation of arranging the first seal on a current collector, which is shown in FIG. 9.
Figure 14:
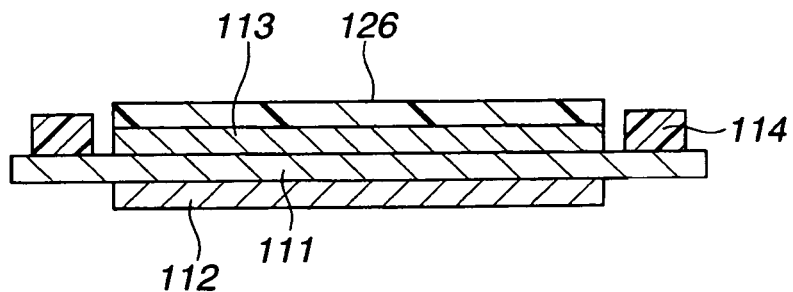
FIG. 14 is a sectional view for describing the operation of arranging the first seal on the current collector, which is shown in FIG. 9.
Figure 15:
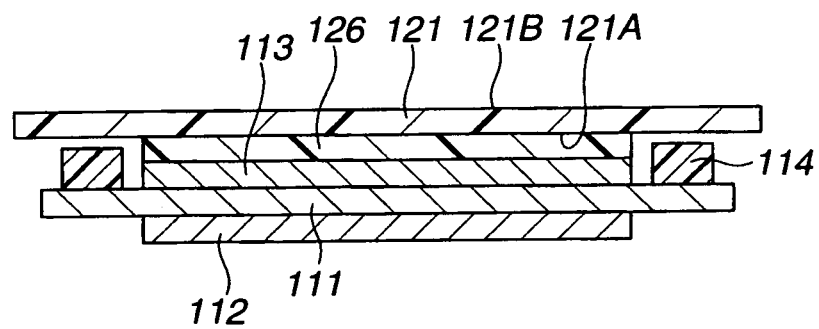
FIG. 15 is a sectional view for describing a separator arrangement operation shown in FIG. 9.
Figure 16:
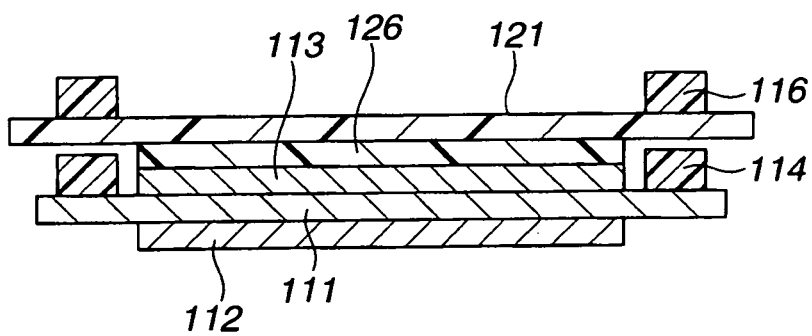
FIG. 16 is a sectional view for describing an operation of arranging the second seal on the separator, which is shown in FIG. 9.

FIG. 9 is a flow chart for describing a sub-assembly unit forming operation shown in FIG. 8. FIG. 10 is a plan view for describing an electrode forming operation shown in FIG. 9. FIG. 11 is a sectional view for describing the electrode forming operation shown in FIG. 9. FIG. 12 is a sectional view for describing an electrolyte arrangement operation shown in FIG. 9. FIG. 13 is a plan view for describing an operation of arranging the first seal 114 on current collector 111, which is shown in FIG. 9. FIG. 14 is a sectional view for describing the operation of arranging the first seal 114 on current collector 111, which is shown in FIG. 9. FIG. 15 is a sectional view for describing a separator arrangement operation shown in FIG. 9. FIG. 16 is a sectional view for describing an operation of arranging the second seal 116 on separator 121, which is shown in FIG. 9.

As shown in FIG. 9, the sub-assembly forming operation includes: an electrode forming operation; an electrolyte arrangement operation; an operation of arranging the first seal 114 on current collector 111; a separator arrangement operation; and an operation of arranging the second seal 116 on separator 121.

The electrolyte forming operation is started by preparing a positive electrode slurry. For example, the positive electrode slurry includes 85 wt % of a positive active material, 5 wt % of a conductivity aid, and 10 wt % of a binder, and has a predetermined viscosity with addition of a viscosity adjusting solvent. The positive active material is LiMn$_2$O$_4$. The conductivity aid is acetylene black. The binder is PVDF (polyvinylidene fluoride). The viscosity adjusting solvent is NMP (N-methyl-2-pyrrolidone). The positive electrode slurry is applied to one surface of current collector 111 made of a stainless steel foil.

The conductivity aid may be carbon black, or graphite, for example. The binder and viscosity adjusting solvent are not limited to PVDF and NMP.

Next, a negative electrode slurry is prepared. For example, the negative electrode slurry includes 90 wt % of a negative active material, and 10 wt % of a binder, and has a predetermined viscosity with addition of a viscosity adjusting solvent. The negative electrode slurry is applied to the other surface of current collector 111. The negative active material is hard carbon. The binder and viscosity adjusting solvent are PVDF and NMP. The negative electrode slurry is applied to the other surface of current collector 111.

The coatings of the positive electrode slurry and negative electrode slurry are dried, for example, with a vacuum oven, forming the positive electrode 113 composed of the positive active material layer, and the negative electrode 112 composed of the negative active material layer (see FIGS. 10 and 11). At the time, NMP is removed by volatilization.

The thicknesses of positive electrode 113 and negative electrode 112 are not specifically limited, but set in consideration of objects of the battery (weighting the output, or weighting the energy, for example), and ion conductivity.

In the electrolyte arrangement operation, before separator 121 is layered on bipolar electrode 110, one of positive electrode 113 and negative electrode 112 on which separator 121 is layered is applied with such an amount of electrolyte 126 as being exposed on the surface of the one electrode. In the first embodiment, in the operation of applying the electrolyte, electrolyte 126 is applied only to positive electrode 113 that serves as "one electrode", and no electrolyte is applied to negative electrode 112 that serves as "other electrode" (see FIG. 12).

In the operation of applying the electrolyte, the amount of the electrolyte applied to positive electrode 113 is equal to the sum of an amount held by positive electrode 113, an amount made to permeate separator 121, and an amount made to permeate through separator 121 to negative electrode 112. Specifically, the amount held by positive electrode 113 includes an amount made to permeate positive electrode 113, and an amount exposed on the surface of positive electrode 113 to from the first layer 124. The amount made to permeate separator 121 specifically includes an amount made to permeate separator 121 to form the second layer 123. The amount made to permeate through separator 121 to negative electrode 112 specifically includes an amount made to permeate negative electrode 112, and an amount exposed on the surface of negative electrode 112 to form the third layer 125.

In the present embodiment, a gel electrolyte is employed. This electrolyte is, for example, composed of 90 wt % of an electrolytic solution, and 10 wt % of a host polymer, and a viscosity adjusting solvent is added to provide a suitable viscosity for application.

The electrolytic solution contains an organic solvent composed of PC (propylene carbonate) and EC (ethylene carbonate), and a lithium salt ($LiPF_6$) as a supporting salt. The concentration of the lithium salt is 1M, for example.

The host polymer is, for example, PVDF—HFP (a copolymer of polyvinylidene fluoride and hexafluoropropylene) containing 10% of a copolymer of HEP (hexafluoropropylene). The viscosity adjusting solvent is DMC (dimethyl carbonate). The viscosity adjusting solvent is not limited to DMC.

In the operation of arranging the first seal 114 on current collector 111, first seal 114 is arranged to extend at the exposed periphery of the positive electrode side of current collector 111 and surround the positive electrode 113 (see FIGS. 13 and 14). The thickness of first seal 114 is set below the sum of the thickness of positive electrode 113 and the thickness of electrolyte 126 exposed on the surface of positive electrode 113 (see FIG. 5A).

In the separator arrangement operation, separator 121 is arranged to cover the entire surface of the side of positive electrode 113 (see FIG. 15). Separator 121 is porous PE. When separator 121 is arranged, a clearance is formed between separator 121 and first seal 114. This prevents bubbles from remaining in the internal space surrounded by first seal 114. Air which is incorporated between separator 121 and electrolyte 126 when separator 121 is arranged, passes through separator 121 itself, so that it does not remain in the form of bubbles.

In the operation of arranging the second seal 116 on separator 121, second seal 116 is arranged on top of separator 121 (see FIG. 16). The thickness of second seal 116 is set below the sum of the thickness of negative electrode 112, and the thickness of electrolyte 127 that is made to permeate through separator 121, and exposed on the surface of negative electrode 112. Second seal 116 is positioned so that second seal 116 corresponds to the position of first seal 114 (second seal 116 overlaps with first seal 114 through separator 121) (see FIG. 16). First and second seals 114, 116 are, for example, one-component uncured epoxy resins.

The formation of sub-assembly unit 108 is completed by the foregoing operations. In sub-assembly unit 108, separator 121 is arranged on the surface of positive electrode 113 to which the electrolyte is applied. At the stage when sub-assembly unit 108 is formed, the electrolyte is not exposed on the surface of negative electrode 112. Accordingly, it is unnecessary to place on the surface of negative electrode 112 a protection film for preventing the electrolyte from being touched. Therefore, it becomes possible to easily deal with sub-assembly unit 108 without such a protection film.

In the separator arrangement operation, bubbles incorporated between separator 121 and positive electrode 113 escape through separator 121 itself to the outside, when left standing. However, bubbles may be actively vacuumed and released. Specifically, in the separator arrangement operation, separator 121 may be arranged on bipolar electrode 110, while separator 121 is vacuumed on a porous board connected to a vacuum pump. The porous board may be implemented by a porous sintered metal board. It is possible to further prevent bubbles from remaining, by actively vacuuming and releasing through separator 121 bubbles incorporated between separator 121 and positive electrode 113.

Figure 17:
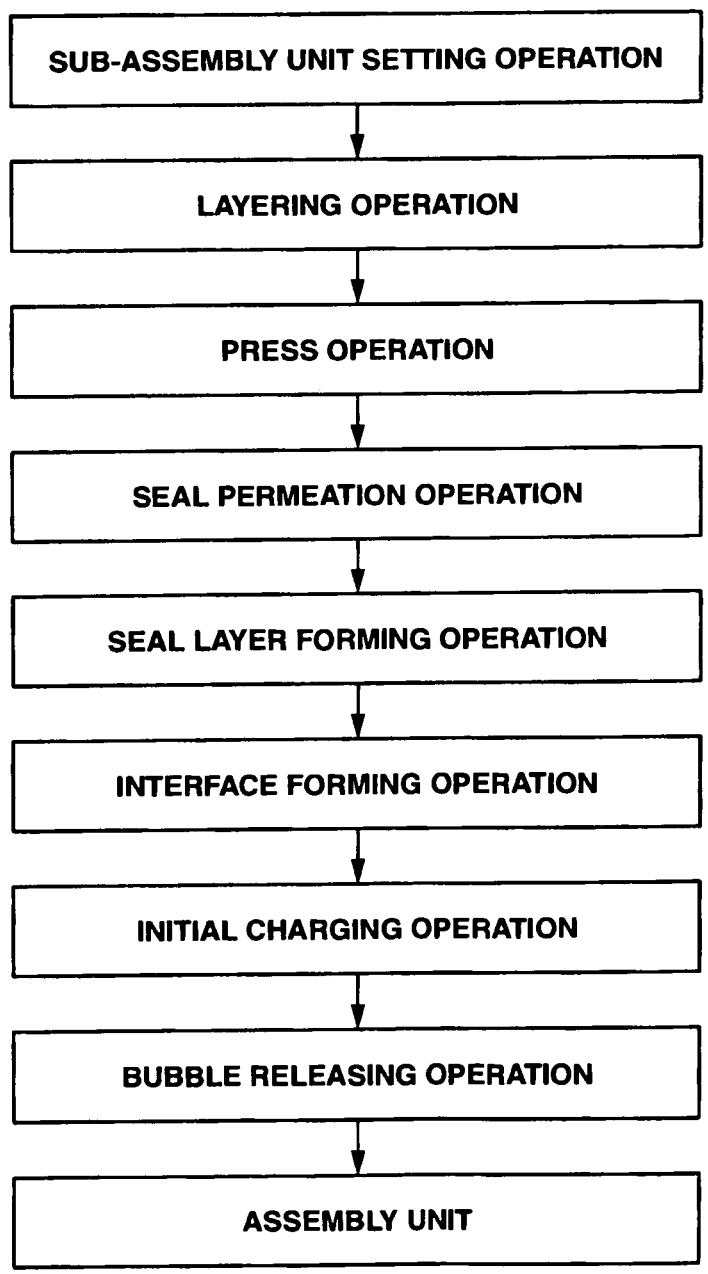
FIG. 17 is a flow chart for describing an assembly unit forming operation shown in FIG. 8.
Figure 18:
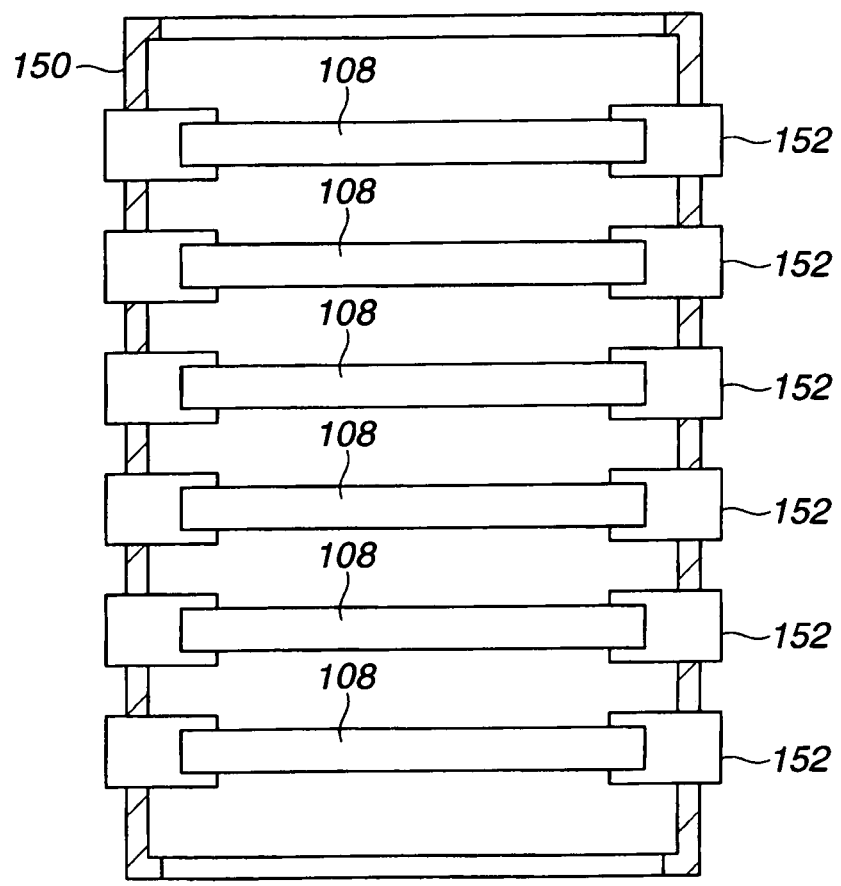
FIG. 18 is a sectional view for describing a sub-assembly unit setting operation shown in FIG. 17.
Figure 19:
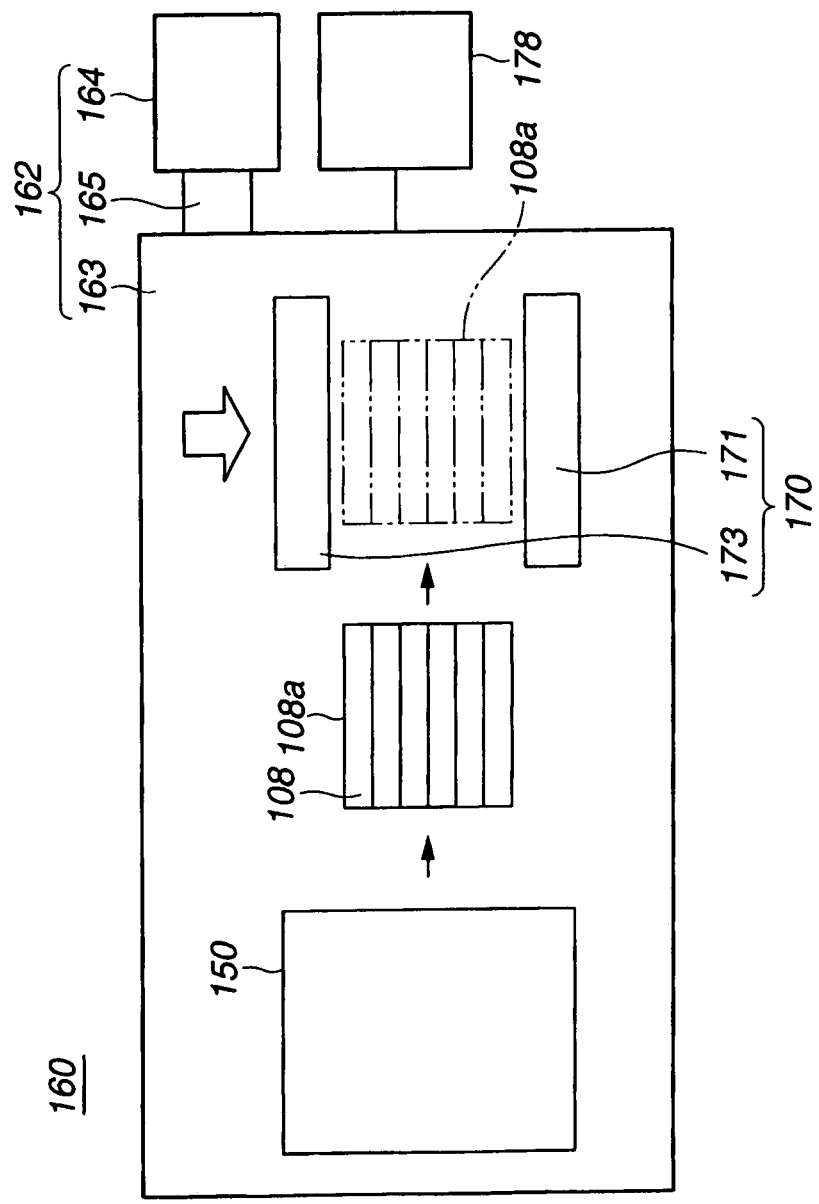
FIG. 19 is a schematic diagram for describing a layering operation and a press operation, which are shown in FIG. 17.
Figure 20:
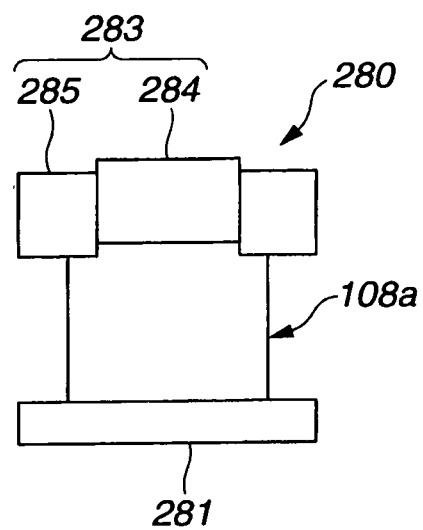
FIG. 20 is a schematic diagram for describing a seal permeation operation shown in FIG. 17.
Figure 21:
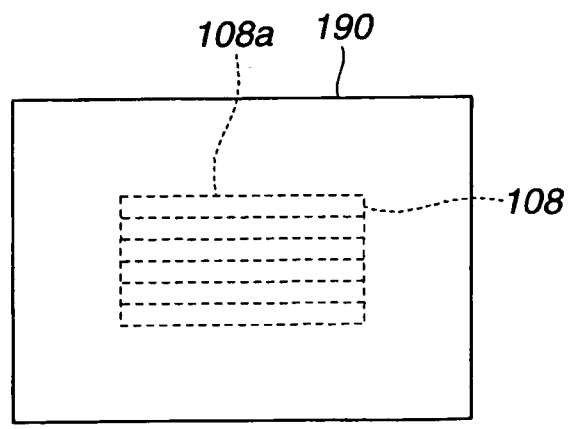
FIG. 21 is a schematic diagram for describing a seal layer forming operation shown in FIG. 17.
Figure 22:
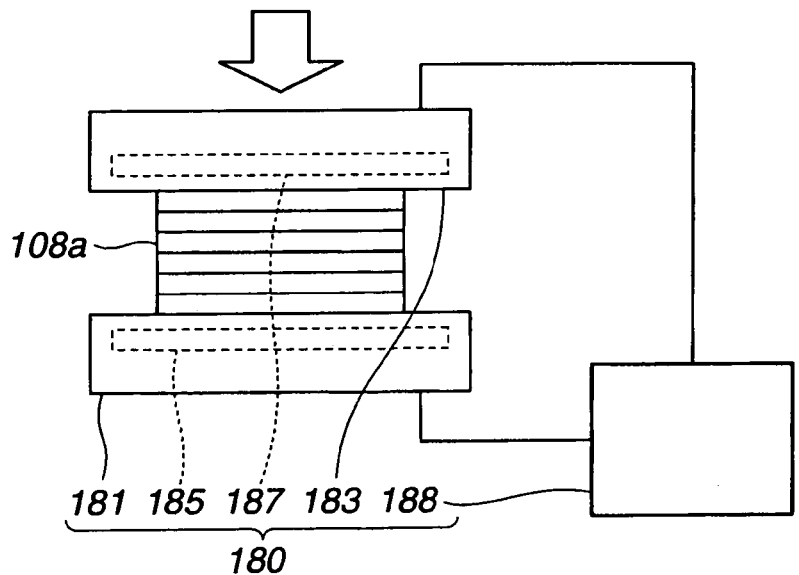
FIG. 22 is a schematic diagram for describing an interface forming operation shown in FIG. 17.
Figure 23:
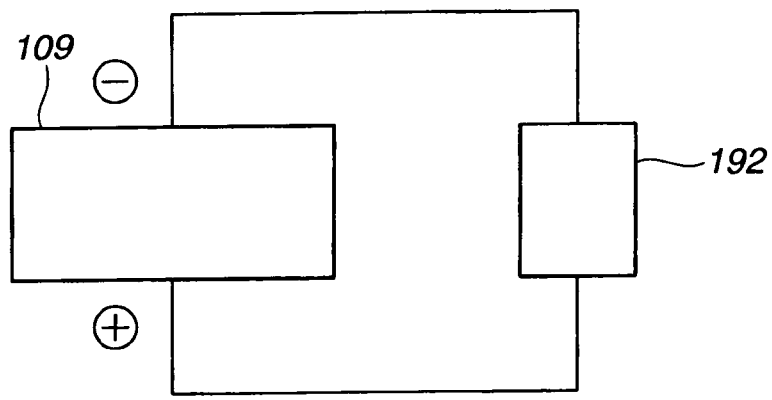
FIG. 23 is a schematic diagram for describing an initial charging operation shown in FIG. 17.

FIG. 17 is a flow chart for describing an assembly unit forming operation shown in FIG. 8. FIG. 18 is a sectional view for describing a sub-assembly unit setting operation shown in FIG. 17. FIG. 19 is a schematic diagram for describing a layering operation and a press operation, which are shown in FIG. 17. FIG. 20 is a schematic diagram for describing a seal permeation operation shown in FIG. 17. FIG. 21 is a schematic diagram for describing a seal layer forming operation shown in FIG. 17. FIG. 22 is a schematic diagram for describing an interface forming operation shown in FIG. 17. FIG. 23 is a schematic diagram for describing an initial charging operation shown in FIG. 17.

The assembly unit forming operation includes a sub-assembly unit setting operation, a layering operation, a press operation, a seal permeation operation, an interface forming operation, an initial charging operation, and bubble releasing operation.

In the sub-assembly unit setting operation, a plurality of sub-assembly units 108 are set to a magazine 150 one after another (see FIG. 18).

Magazine 150 is in the form of a frame so as to avoid interference when sub-assembly units 108 are set, and includes clamping devices 152 each of which is capable of cramping the periphery of sub-assembly unit 108.

Clamping devices 152 are arranged in the direction of layering with a spacing so as to prevent sub-assembly units 108 from contacting one another. The direction of layering is a direction perpendicular to the surface direction of sub-assembly unit 108.

For example, clamping device 152 includes an elastic member in the form of a spring, and holds sub-assembly unit 108 under a condition that tension is added to sub-assembly unit 108 by the elastic force to prevent sub-assembly unit 108 from becoming crinkled.

In the layering operation, magazine 150 is arranged inside a vacuum operating device 160, and a layered product 108a of sub-assembly units 108 is formed under vacuum (see FIG. 19). The degree of vacuum is from $0.2 \times 10^5$ to $0.5 \times 10^5$ Pa, for example. In cases where both of positive electrode 113 and negative electrode 112 are applied with a high polymer gel electrolyte, the electrode of the upper sub-assembly unit where the high polymer gel electrolyte is exposed, is arranged on the separator of the lower sub-assembly unit, while the sub-assembly units are layered. The high polymer gel electrolyte which is viscous can trap bubbles. In contrast, in the first embodiment, when sub-assembly units 108 are layered, separator 121 is arranged on the surface of negative electrode 112 on which the high polymer gel electrolyte is not exposed. Accordingly, no bubbles are trapped by the high polymer gel electrolyte which is viscous. Moreover, because of the vacuum condition, air incorporated between separator 121 and the electrolyte on the surface of positive electrode 113 when separator 121 is arranged can escape easily through separator 121 itself. This further suppresses the incorporation of bubbles.

The method of forming the layered product 108a is not specifically limited, but may be implemented for example by controlling the clamping devices 152 which hold sub-assembly units 108, so as to release the sub-assembly units 108 one after another at timings of contact with a receiving stage, while causing the magazine 150 to move toward the receiving stage.

Vacuum operating device 160 includes a vacuum means 162, a press means 170, and a control section 178.

Vacuum means 162 includes a vacuum chamber 163, a vacuum pump 164, and a pipe system 165. Vacuum chamber 163 includes a detachable (openable) cover part, and a fixed base part where magazine 150 and press means 170 are arranged. Vacuum pump 164 is, for example, of a centrifugal type, and used to vacuum air from inside of vacuum chamber 163. Pipe system 165 is used to connect vacuum pump 164 to vacuum chamber 163. Pipe system 165 is provided with a leak valve not shown.

Press means 170 includes a base plate 171, and a press plate 173 arranged so that the position of press plate 173 can be adjusted with respect to base plate 171. A control section 178 is used to control the movement and pressing force of press plate 173. Base plate 171 and press plate 173 may be provided with an elastic member in the form of a sheet.

In the press operation, layered product 108a is pressed in the direction of layering the sub-assembly units 108, by press plate 173 and base plate 171, with the condition of vacuum maintained. The press condition is from $1 \times 10^6$ to $2 \times 10^6$ Pa, for example. The press operation causes the gel electrolyte, which is applied only to positive electrode 113, to permeate positive electrode 113, and also permeate separator 121. The gel electrolyte further permeates through separator 121 to the side of negative electrode 112, and permeate negative electrode 112. On the surface of positive electrode 113 is exposed an amount of the gel electrolyte needed to form the first layer 124. Separator 121 is permeated by an amount of the gel electrolyte needed to form the second layer 123. Also, on the surface of negative electrode 112 is exposed an amount of the gel electrolyte needed to form the third layer 125. The permeation of the gel electrolyte described above is partly achieved in the layering operation.

It is preferable to heat the plurality of layered sub-assembly units 108, namely, layered product 108a. This is because when heated, the gel electrolyte is dissolved so as to adequately and uniformly permeate each of positive electrode 113, separator 121, and negative electrode 112. As compared to the case based only on pressing, it is possible to promote the permeation of the electrolyte.

For heating the layered product 108a, press plate 173 and base plate 171 may be provided with a resistance heating element as a heating means inside. It is possible to raise the temperatures of press plate 173 and base plate 171 so as to heat the layered product 108a. A heating means may be arranged inside one of press plate 173 and base plate 171, or arranged outside of press plate 173 and base plate 171.

In order to suppress the incorporation of bubbles in the internal space surrounded by first and second seals 114, 116, the thickness of first seal 114 is set smaller than the sum of the thicknesses of positive electrode 113 and electrolyte 126 exposed on the surface of positive electrode 113, whereas the thickness of second seal 116 is set smaller than the sum of the thicknesses of negative electrode 112 and electrolyte 127 exposed on the surface of negative electrode 112. Under this condition, it is possible that when layered product 108a is pressed flatly, the pressing force is not adequately transmitted to a part to be charged (where first and second seals 114, 116 are arranged). This may cause inadequate sealing.

Accordingly, a press means 280 is used, and a seal permeation operation for mainly pressing the first and second seals 114, 116 in layered product 108a, so that first and second seals 114, 116 are made to adequately permeate separator 121 (see FIG. 20). This forms the sealing part 119 (see FIG. 6).

The part that is permeated by first and second seals 114, 116 is cured by heating in the seal forming operation, so as to enhance the adherence of first and second seal layers 115, 117 (see FIG. 4).

Press means 280 includes: a base plate 281 on which layered product 108a is arranged; a press plate 283 arranged so that the position of press plate 283 can be adjusted with respect to base plate 281; and a control section not shown. Press plate 283 is in a split form, including a central press plate 284 and a peripheral press plate 285.

Central press plate 284 is used to support a portion of layered product 108a where an electrode portion (where positive electrode 113 and negative electrode 112 are arranged) is positioned. Peripheral press plate 285 used to press the charging target portion of laminated unit 108a. The control section is used to control the movement and pressing force of central press plate 284 and peripheral press plate 285.

Accordingly, press means 280 is capable of pressing only the charging target portion of layered product 108a, which is arranged on base plate 281, by peripheral press plate 285. First and second seals 114, 116 are pressed in the direction of layering the sub-assembly units 108, so that current collector 111, separator 121, and first and second seals 114, 116 are adhered to each other, thus forming the sealing part 119 that prevents the electrolyte from leaking.

It is preferable to perform the pressing operation of peripheral press plate 285 after the electrode portion of layered product 108a is pressed by central press plate 284. This suppresses the incorporation of bubbles in the electrode portion, because bubbles positioned in the electrode portion can be moved toward the periphery.

Since generation of dead spaces where ion permeation and electron movement are impossible is suppressed, it prevents ion movement during use from being interrupted, and prevents the battery resistance from increasing, thus achieving a high output density. Namely, since bipolar battery 10 is obtained with the incorporation of bubbles 30 suppressed, it prevents ion movement during use from being interrupted, and prevents the battery resistance from increasing.

The press operation and seal permeation operation may be integrated when necessary.

In the seal layer forming operation, layered product 108a is arranged in an oven 190, and heated. As a result, first and second seals 114, 116, which are included in layered product 108a, are cured by heating, so as to form the first and second seal layers 115, 117 (see FIGS. 21 and 4). The heating condition is 80° C., for example. The method of heating the layered product 108a is not specifically limited to the form using an oven.

Moisture is not favorable for lithium secondary batteries. However, the incorporation of moisture is inevitable, because first and second seal layers 115, 117 are made of resin. Accordingly, in the press operation, the thicknesses of first and second seals 114, 116 are set so that the thicknesses of portions of first and second seal layers 115, 117 that are subject to outside air are minimized, in consideration of reduction of entering moisture.

First and second seals 114, 116 may be made of thermoplastic resins. In this case, when heated, first and second seals 114, 116 plastically deform to form first and second seal layers 115, 117.

In the interface forming operation, layered product 108a is arranged on press means 180, and pressed under heating (see FIG. 22). The permeation of the gel electrolyte adequately progresses so as to form the first layer 124 containing the electrolyte conducting ions between positive electrode 113 and separator 121, the second layer 123 where the electrolyte is made to permeate separator 121, and the third layer 125 containing the electrolyte conducting ions between negative electrode 112 and separator 121 (see FIG. 4). The heating and pressing conditions are 80° C. and from $1\times10^6$ to $2\times10^6$ Pa, for example. In this way, sub-assembly units 108 are layered together to obtain assembly unit 109.

Press means 180 includes: a base plate 181; a press plate 183 arranged so that the position of press plate 183 can be adjusted with respect to base plate 181; a lower part heating means 185; an upper part heating means 187; and a control section 188. Lower part heating means 185 and upper part heating means 187 are provided with a resistance heating element, for example, arranged in base plate 181 and press plate 183, and used to raise the temperatures of base plate 181 and press plate 183. Control section 188 is used to control the movement and pressing force of press plate 183, and the temperatures of lower part heating means 185 and upper part heating means 187.

One of lower part heating means 185 and upper part heating means 187 may be omitted. Lower part heating means 185 and upper part heating means 187 may be arranged outside of the base plate 181 and press plate 183. Base plate 181 and press plate 183 may be provided with an elastic member in the form of a sheet.

In the initial charging operation, initial charging is performed by a charge and discharge device 192 which is electrically connected to assembly unit 109, so that bubbles are generated (see FIG. 23). The condition of initial charging is, 4 hours at 21V-0.5C, on a basis of capacity estimated from the weight of application of positive electrode 113, for example.

In the bubble releasing operation, bubbles at the center of assembly unit 109 are moved to the periphery, and removed, for example, by pressing the surface of assembly unit 109 with a roller. This makes it possible to enhance the output density of the battery. After this operation, assembly unit 109 constitutes the cell part 100.

In the casing operation shown in FIG. 8, cell part 100 constituted by assembly unit 109 is enclosed in exterior case 104 (see FIG. 2). In this way, bipolar battery 10 is manufactured (see FIGS. 1 and 2). Exterior case 104 is formed by arranging the cell part 100 between two exterior materials in the form of two sheets, and splicing the peripheries of the exterior materials. The exterior material is a composite laminate film of a high polymer and a metal which is coated with an insulator such as a polypropylene film. The splicing is implemented by fusion splice.

A plurality of cell parts 100 may be further layered, and then enclosed in exterior case 104, thus further enhancing the capacity and output of bipolar battery 10. The layering operation and press operation my be performed under the atmosphere pressure. The seal layer forming operation and interface forming operation may be performed under vacuum.

The seal layer forming operation and interface forming operation may be integrated with suitable selection of electrolytes 124, 125 and first and second seals 114, 116. Simultaneous implementation of curing of first and second seals 114, 116 and completeness of electrolyte layer 120 makes it possible to shorten the period of the manufacturing process: Between the seal layer forming operation and interface forming operation may be added an operation of attaching tabs (lead wires) for monitoring the electric potential of each bipolar cell.

As described above, the first embodiment can provide a bipolar battery manufacturing method of manufacturing a bipolar battery superior in performance, and such a bipolar battery, wherein the output density is enhanced by suppression of the incorporation of bubbles.

Bipolar battery 10 can be prevented from liquid leaking, liquid junction, and thereby made highly reliable, because the high polymer gel electrolyte is of a thermoplastic type containing the electrolytic solution in the polymer skeleton. The gel electrolyte is not limited to thermoplastic types, but may be of a thermosetting type. In such cases, it is possible to cure the electrolyte layer 120 by pressing under heating, so as to prevent liquid leaking and liquid junction.

In the press operation and interface forming operation, the contact pressure is not limited to from $1\times10^6$ to $2\times10^6$ Pa, but may be set in consideration of physical properties such as the strength of the material of cell part 100. In the seal layer forming operation, the temperature after heating is not limited to 80° C., but may be preferably from 60° C. to 150° C. in consideration of the heat resistance of the electrolytic solution and the thermosetting temperatures of first seal 114 (first seal layer 115) and second seal 116 (second seal layer 117), for example.

The electrolyte is not limited to gel electrolytes, but may be of an electrolytic solution type. In such cases, in the electrolyte arrangement operation (see FIG. 12), the electrolytic solution is applied to and made to permeate one electrode, for example, positive electrode 113, for example, by a micropipette (see FIG. 12).

The electrolytic solution includes an organic solvent composed of PC (propylene carbonate) and EC (ethylene carbonate), a lithium salt ($LiPF_6$) as a supporting salt, and a small amount of a surfactant, for example. The concentration of the lithium salt is 1M, for example.

The organic solvent is not limited to PC and EC, but may be another cyclic carbonate, a chain carbonate such as dimethyl carbonate, or an ether such as tetrahydrofuran. The lithium salt is not limited to $LiPF_6$, but may be another inorganic acid anionic salt, or an organic acid anionic salt such as $LiCF_3SO_3$.

Modification of First Embodiment

In the first embodiment described above, in the operation of applying the electrolyte, the gel electrolyte is applied only to positive electrode 113 which is one of the electrodes, but the present invention is not so limited. In the operation of forming the sub-assembly unit, one of positive electrode 113 and negative electrode 112 opposite to the electrode on which separator 121 is arranged my be applied beforehand with such an amount of electrolyte as permeating the electrode but not exposed on the surface of the electrode. This makes it possible to prevent inadequate permeation of the electrolyte. Moreover, since the electrolyte is not exposed on the surface of the electrolyte, bubbles are not incorporated during layering of sub-assembly unit 108. Moreover, for a modification of the first embodiment, in the operation of applying the electrolyte, negative electrode 112 which is the other electrode may be applied with such an amount of electrolyte as permeating the negative electrode 112 but not exposed on the surface of negative electrode 112. The amount of the electrolyte applied to positive electrode 113 is equal to the sum of an amount held by positive electrode 113, an amount made to permeate separator 121, and an amount made to permeate through separator 121 to negative electrode 112. The amount made to permeate through separator 121 to negative electrode 112 is equal to the amount produced by subtracting the amount applied beforehand to negative electrode 112, as compared to the embodiment described above.

Also in such a modification, at the stage when sub-assembly unit 108 is formed, the electrolyte is not exposed on the surface of negative electrode 112. Accordingly, it is unnecessary to place on the surface of negative electrode 112 a protection film for preventing the electrolyte from being touched. Therefore, it becomes possible to easily deal with sub-assembly unit 108 without such a protection film. When sub-assembly unit 108 is layered, separator 121 is arranged on the surface of negative electrode 112 on which the electrolyte is not exposed. Accordingly, bubbles are not incorporated by the viscous gel electrolyte.

Second Embodiment

Figure 24A:
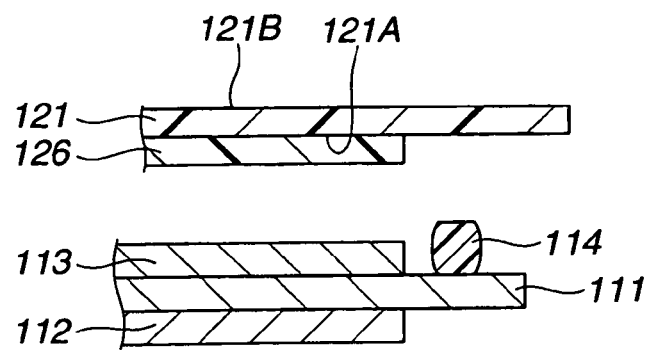
FIG. 24A is a sectional view for describing a sub-assembly unit according to a second embodiment.
Figure 24B:
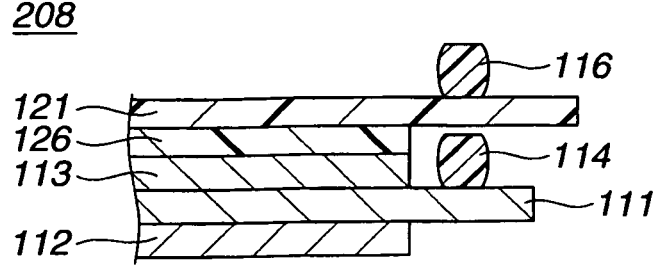
FIG. 24B is a sectional view for describing the sub-assembly unit according to the second embodiment.
Figure 24C:
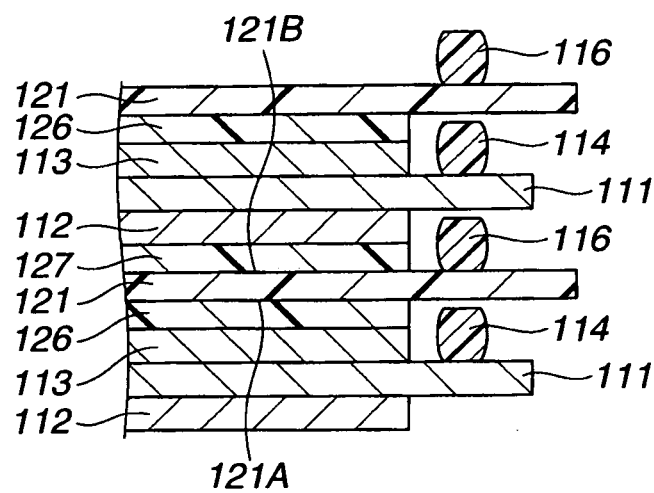
FIG. 24C is a sectional view showing a condition that sub-assembly units according to the second embodiment are layered together, and an electrolyte is made to permeate through a separator, and exposed on a surface of a negative electrode.

FIGS. 24A and 24B are sectional views for describing a sub-assembly unit 208 according to a second embodiment. FIG. 24C is a sectional view showing a condition that sub-assembly units 208 are layered together, and an electrolyte is made to permeate through separator 121, and exposed on a surface of negative electrode 112. The same characters are given to common members between the second embodiment and first embodiment, and part of description of them is omitted.

In the second embodiment, the first surface 121A of separator 121 is a surface facing the bipolar electrode 110, and the electrolyte is positioned between bipolar electrode 110 and separator 121, as in the first embodiment. However, in the second embodiment, the electrolyte is applied to the surface of separator 121 facing the bipolar electrode 110 (i.e. first surface 121A), before separator 121 is layered on bipolar electrode 110. The second embodiment is different in this point from the first embodiment in which before separator 121 is layered on bipolar electrode 110, the electrolyte is applied to positive electrode 113 which is one of positive electrode 113 and negative electrode 112 on which separator 121 is arranged.

Manufacturing the bipolar battery 10 according to the second embodiment is started by preparing the bipolar electrode 110 and separator 121 (see FIG. 24A). In the shown example, the first surface 121A of separator 121 is one of the surfaces of separator 121 that contacts positive electrode 113. Next, separator 121 to which the electrolyte is applied is layered so that first surface 121A faces positive electrode 113, thus forming the sub-assembly unit 208 (see FIG. 24B). Then, a plurality of sub-assembly units 208 are layered (see FIG. 24C), and electrolyte 126 applied to separator 121 is made to permeate through separator 121 to negative electrode 112 that faces the second surface 121B of separator 121, thus forming the assembly unit 109 (see FIG. 4). FIG. 24C shows a condition that sub-assembly units 208 are layered together, and electrolyte 127 is made to permeate through separator 121, and exposed on a surface of negative electrode 112.

In the second embodiment, electrolyte 126 is positioned between bipolar electrode 110 and separator 121, as in the first embodiment. In this case, as in the first embodiment, as shown in FIGS. 24A and 24B, the thickness of first seal 114 arranged on current collector 111 is set below the sum of the thickness of positive electrode 113 and the thickness of electrolyte 126 applied to separator 121. Moreover, the thickness of second seal 116 arranged on separator 121 is set below the sum of the thickness of negative electrode 112 and the thickness of electrolyte 127 that is made to permeate through separator 121 and exposed on the surface of negative electrode 112.

Figure 25:
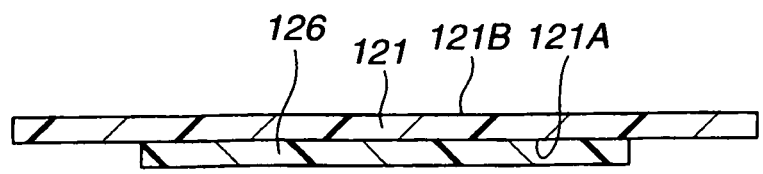
FIG. 25 is a sectional view for describing an electrolyte arrangement operation in the second embodiment.
Figure 26:
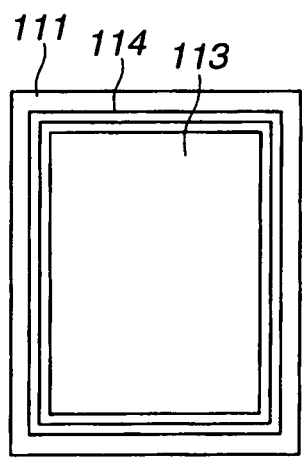
FIG. 26 is a plan view for describing an operation of arranging a first seal on a current collector in the second embodiment.
Figure 27:
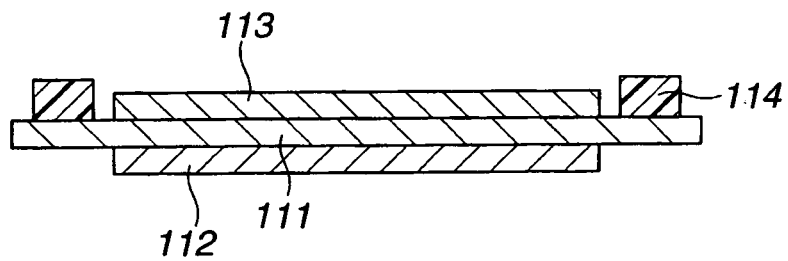
FIG. 27 is a sectional view for describing the operation of arranging the first seal on the current collector in the second embodiment.
Figure 28:
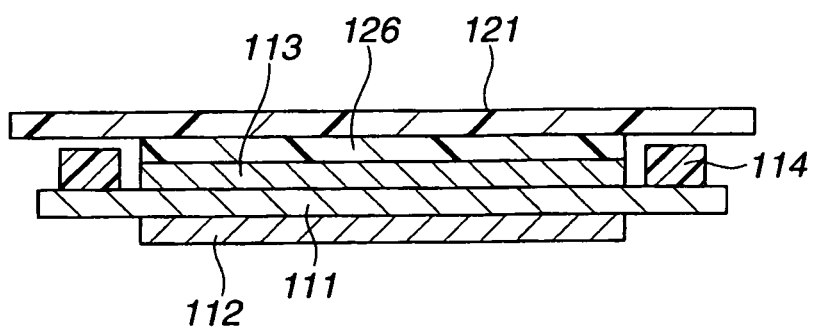
FIG. 28 is a sectional view for describing a separator arrangement operation in the second embodiment.

FIG. 25 is a sectional view for describing an electrolyte arrangement operation in the second embodiment. FIGS. 26 and 27 are a plan view and a sectional view for describing an operation of arranging the first seal 114 on current collector 111 in the second embodiment. FIG. 28 is a sectional view for describing a separator arrangement operation in the second embodiment.

The second embodiment is different from the first embodiment in the electrolyte arrangement operation, the operation of arranging the first seal 114 on current collector 111, and the separator arrangement operation.

Referring to FIG. 25, in the electrolyte arrangement operation, the electrolyte is applied to the first surface 121A of separator 121, before separator 121 is layered on bipolar electrode 110. The first surface 121A of separator 121 is one of the surfaces of separator 121 that contacts positive electrode 113. Electrolyte 126 is applied only to a portion of first surface 121A of separator 121 that contacts positive electrode 113. An adequate amount of electrolyte 126 is applied so that pores of positive electrode 113, negative electrode 112, and separator 121 are fully charged. In the second embodiment, electrolyte 126 is applied only to first surface 121A of separator 121, whereas no electrolyte is applied to positive electrode 113 and negative electrode 112.

Referring to FIGS. 26 and 27, in the operation of arranging the first seal 114 on current collector 111, first seal 114 is arranged on the periphery of the positive electrode side where current collector 111 is exposed, the first seal 114 extending and surrounding the positive electrode 113. Referring to FIG. 28, in the separator arrangement operation, separator 121 to which electrolyte 126 is applied is arranged to cover the entire surface of the side of positive electrode 113. The thickness of first seal 114 is set below the sum of the thickness of positive electrode 113 and the thickness of electrolyte 126 exposed on the surface of positive electrode 113. Accordingly, when separator 121 is arranged, a clearance is formed between separator 121 and first seal 114. This suppresses the incorporation of bubbles in the internal space surrounded by first seal 114. Air that is incorporated between separator 121 and electrolyte 126 when separator 121 is arranged escapes through separator 121 itself, without remaining in the form of bubbles.

The following steps are similar to the first embodiment, for which description is omitted.

As described above, according to the second embodiment in which the electrolyte is applied to first surface 121A that is one of the surfaces of separator 121 that is arranged on bipolar electrode 110, it is possible to suppress the incorporation of bubbles, and thereby enhance the output density, and manufacture the bipolar battery superior in performance, as in the first embodiment.

Third Embodiment

Figure 29A:
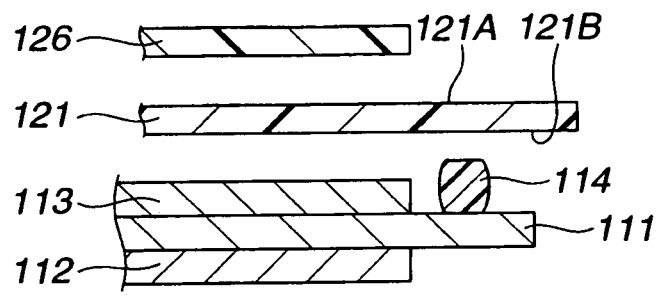
FIG. 29A is a sectional view for describing a sub-assembly unit according to a third embodiment.
Figure 29B:
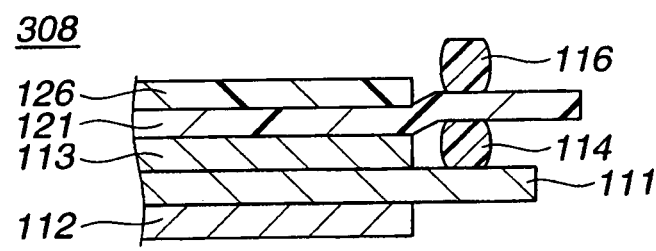
FIG. 29B is a sectional view for describing the sub-assembly unit according to the third embodiment.
Figure 29C:
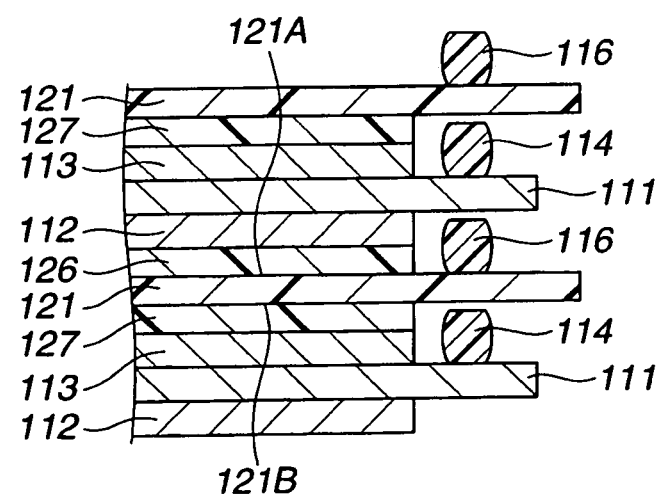
FIG. 29C is a sectional view showing a condition that sub-assembly units according to the third embodiment are layered together, and an electrolyte is made to permeate through a separator, and exposed on a surface of a positive electrode.

FIGS. 29A and 29B are sectional views for describing a sub-assembly unit 308 according to a third embodiment. FIG. 29C is a sectional view showing a condition that sub-assembly units 308 are layered together, and electrolyte 127 is made to permeate through separator 121, and exposed on a surface of positive electrode 113. The same characters are given to common members between the third embodiment and first embodiment, and part of description of them is omitted.

The third embodiment is different from the first and second embodiments in that first surface 121A of separator 121 is an outside surface opposite to the surface facing the bipolar electrode 110, and the electrolyte is positioned on the outside surface of separator 121 arranged on bipolar electrode 110. Accordingly, in the third embodiment, after separator 121 is layered on bipolar electrode 110, the electrolyte is applied to the outside surface of separator 121 opposite to the surface facing the bipolar electrode 110 (i.e. first surface 121A).

Manufacturing the bipolar battery 10 according to the third embodiment is started by preparing the bipolar electrode 110 and separator 121. Next, separator 121 is layered on one of positive electrode 113 of negative electrode 112 (see FIG. 29A). In the shown example, separator 121 is layered on positive electrode 113. Next, electrolyte 126 is applied to first surface 121A of separator 121, thus forming the sub-assembly unit 308 (see FIG. 29B). The first surface 121A of separator 121 is one of the surfaces of separator 121 that is the outside surface of separator 121 opposite to the surface facing the bipolar electrode 110. Then, a plurality of sub-assembly units 308 are layered (see FIG. 29C), and electrolyte 126 applied to separator 121 is made to permeate through separator 121 to positive electrode 113 that faces the second surface 121B of separator 121, thus forming the assembly unit 109 (see FIG. 4). FIG. 29C shows a condition that sub-assembly units 308 are layered together, and electrolyte 127 is made to permeate through separator 121, and exposed on a surface of positive electrode 113.

In the third embodiment, electrolyte 126 is positioned on the outside surface of separator 121 that faces the bipolar electrode 110. In this case, as shown in FIGS. 29B and 29C, the thickness of first seal 114 arranged on current collector 111 is set below the sum of the thickness of positive electrode 113 and the thickness of electrolyte 127 that is made to permeate through separator 121 and exposed on the surface of positive electrode 113. Moreover, the thickness of second seal 116 arranged on separator 121 is set below the sum of the thickness of negative electrode 112 and the thickness of electrolyte 126.

Figure 30:
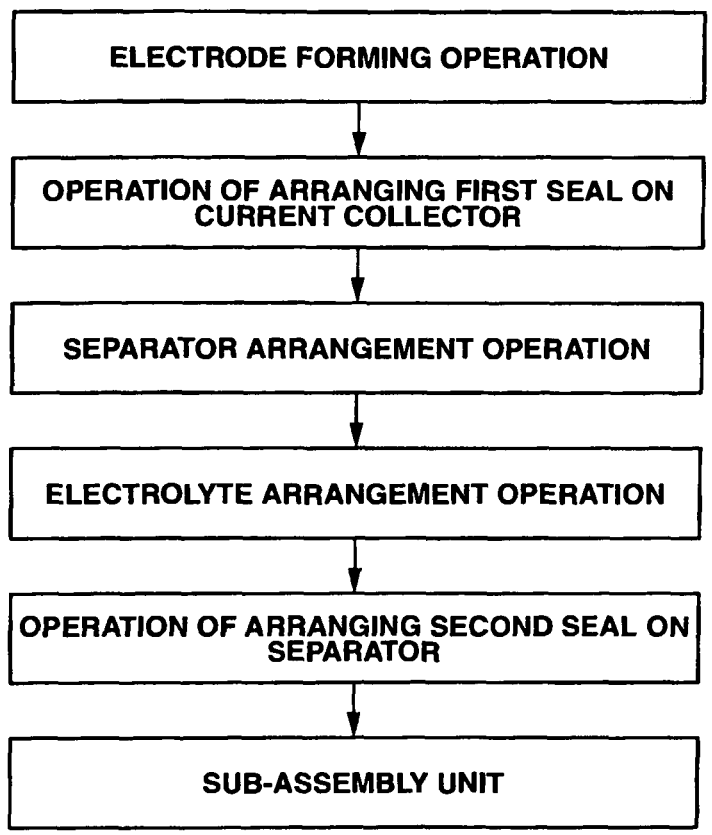
FIG. 30 is a flow chart for describing a sub-assembly unit forming operation according to the third embodiment.
Figure 31:
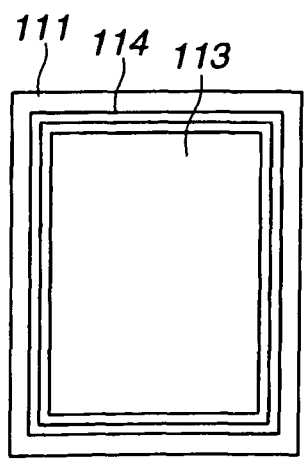
FIG. 31 is a plan view for describing an operation of arranging a first seal on a current collector in the third embodiment.
Figure 32:
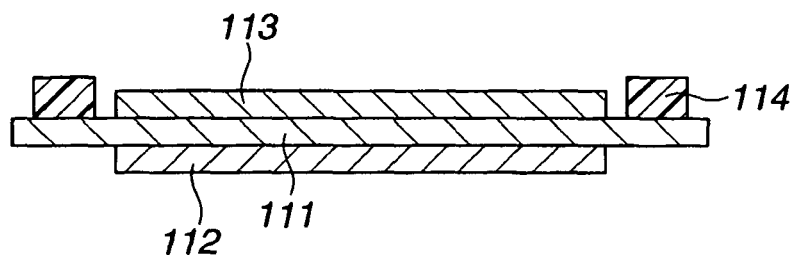
FIG. 32 is a sectional view for describing the operation of arranging the first seal on the current collector in the third embodiment.
Figure 33:
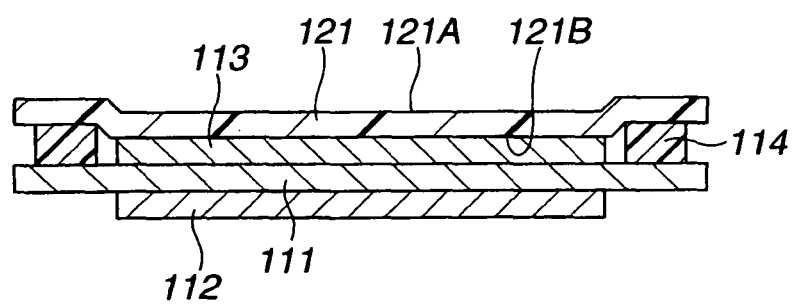
FIG. 33 is a sectional view for describing a separator arrangement operation according to the third embodiment.
Figure 34:
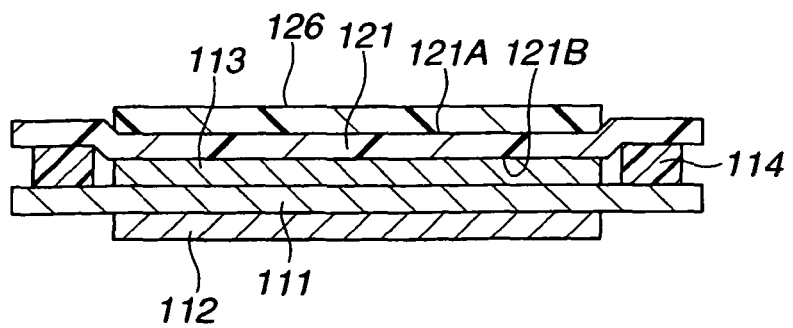
FIG. 34 is a sectional view for describing an electrolyte arrangement operation according to the third embodiment.
Figure 35:
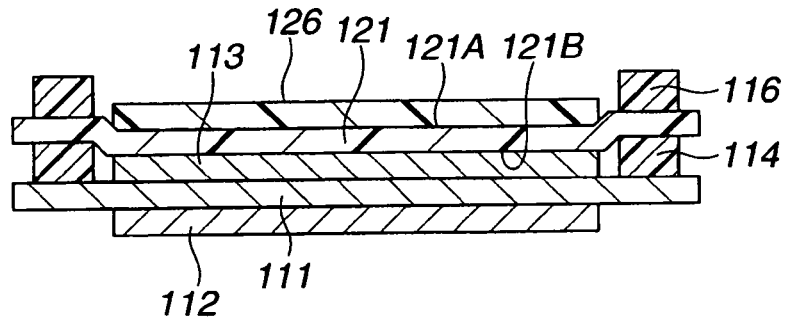
FIG. 35 is a sectional view for describing an operation of arranging a second seal on the separator in the third embodiment.

FIG. 30 is a flow chart for describing a sub-assembly unit forming operation according to the third embodiment. FIGS. 31 and 32 are a plan view and a sectional view for describing an operation of arranging the first-seal 114 on current collector 111 in the third embodiment. FIG. 33 is a sectional view for describing a separator arrangement operation according to the third embodiment. FIG. 34 is a sectional view for describing an electrolyte arrangement operation according to the third embodiment. FIG. 35 is a sectional view for describing an operation of arranging the second seal 116 on separator 121 in the third embodiment.

As shown in FIG. 30, the sub-assembly unit forming operation includes an electrode forming operation, an operation of arranging the first seal 114 on current collector 111, a separator arrangement operation, an electrolyte arrangement operation, and an operation of arranging the second seal 116 on separator 121. In the third embodiment, the electrolyte arrangement operation is performed after the separator arrangement operation.

Referring to FIGS. 31 and 32, in the operation of arranging the first seal 114 on current collector 111, first seal 114 is arranged on the periphery of the positive electrode side where current collector 111 exposed, the first seal 114 extending and surrounding the positive electrode 113.

Referring to FIG. 33, in the separator arrangement operation, separator 121 is arranged to cover the entire surface of the side of positive electrode 113. Since electrolyte 126 is not yet applied to positive electrode 113 and separator 121, arrangement of separator 121 does not cause bubbles to be incorporated in the electrolyte.

Referring to FIG. 34, in the electrolyte arrangement operation, after separator 121 is layered on bipolar electrode 110, the electrolyte is applied to the first surface 121A of separator 121. The first surface 121A is the outside surface of separator 121 that is one of the surfaces of separator 121 opposite to the surface facing the positive electrode 113. Electrolyte 126 is applied only to a portion of first surface 121A of separator 121 that contacts negative electrode 112. An adequate amount of electrolyte 126 is applied so that pores of positive electrode 113, negative electrode 112, and separator 121 are fully charged. In the third embodiment, electrolyte 126 is applied only to first surface 121A of separator 121, whereas no electrolyte is applied to positive electrode 113 and negative electrode 112.

Referring to FIG. 35, in the operation of arranging the second seal 116 on separator 121, second seal 116 is arranged on separator 121. Second seal 116 is positioned so that second seal 116 corresponds to the position of first seal 114 (second seal 116 overlaps with first seal 114 through separator 121). First and second seals 114, 116 are, for example, one-component uncured epoxy resins.

The thickness of first seal 114 is set below the sum of the thickness of positive electrode 113 and the thickness of electrolyte 127 that is made to permeate through separator 121 and exposed on the surface of positive electrode 113. Accordingly, in the operation of forming the assembly unit, a clearance is formed between separator 121 and first seal 114, when electrolyte 126 is made to permeate through separator 121 to positive electrode 113. This suppresses the incorporation of bubbles in the internal space surrounded by first seal 114.

Moreover, the thickness of second seal 116 is set below the sum of the thickness of negative electrode 112 and the thickness of the left electrolyte 126. Accordingly, a clearance is formed between current collector 111 and second seal 116, when sub-assembly unit 108 is layered so that electrolyte 127 is made to permeate through separator 121 to positive electrode 113. This suppresses the incorporation of bubbles in the internal space surrounded by second seal 116 (see FIG. 29C).

The following steps are similar to the first embodiment, for which description is omitted.

As described above, according to the third embodiment in which the electrolyte is applied to first surface 121A that is the outside surface out of the surfaces of separator 121 opposite to the surface facing the bipolar electrode 110, it is possible to suppress the incorporation of bubbles, and thereby enhance the output density, and manufacture the bipolar battery superior in performance, as in the first and second embodiments.

Examples

The following describes examples related to the first to third embodiments. Bipolar batteries were prepared as follows.

<Preparation of Bipolar Electrode> The positive electrode slurry was prepared by adding acetylene black as a conductivity aid (5 wt %), polyvinylidene fluoride (PVDF) as a binder (10 wt %), and N-methyl-2-pyrrolidone (NMP) as a slurry viscosity adjusting solvent to $LiMn_2O_4$ (85 wt %, with an average particle size of 15 µm) as a positive active material, until the positive electrode slurry had a viscosity suitable for the application operation. The positive electrode slurry was applied to one surface of a stainless steel foil (thickness of 20 µm) as a current collector, and dried, thus forming the positive electrode.

The negative electrode slurry was prepared by adding PVDF as a binder (10 wt %), and NMP as a slurry viscosity adjusting solvent to hard carbon as a negative active material (90 wt %, with an average particle size of 20 µm), until the negative electrode slurry had a viscosity suitable for the application operation. The negative electrode slurry was applied to a surface of the stainless steel foil that was opposite to the surface to which the positive electrode was applied, and dried, thus forming the negative electrode.

The positive and negative electrodes were formed on respective surfaces of the stainless foil as a current collector, thus forming a bipolar electrode. The bipolar electrode was pressed with a heating roll press. After pressing, the thickness of the positive electrode was 20 μm, and the thickness of the negative electrode was 30 μm.

The bipolar electrode was cut into 240 mm×290 mm, and the 20 mm peripheries of the positive and negative electrodes were removed to expose a surface of the stainless foil as a current collector. In this way, the bipolar electrode was prepared with the electrode surface of 200 mm×250 mm, in which 20 mm of the stainless foil as a current collector was exposed at the periphery.

<Formation of High Polymer Gel Electrolyte> A pre-gel electrolyte was prepared by adding PVDF—HFP (10 wt %) containing 10% of a copolymer of HEP as a host polymer, and DMC as a viscosity adjusting solvent to an electrolytic solution (90 wt %) containing an organic solvent composed of PC and EC, and 1M of $LiPF_6$, until it had a viscosity suitable for the application operation. The high polymer gel electrolyte was applied to the positive electrode portion, the negative electrode portion, the surface of the separator on the positive electrode side, or the surface of the separator on the negative electrode side, as shown in Table 1, and DMC was dried, so as to complete a bipolar electrode that was permeated by a high polymer gel electrolyte. The adequate amount of the electrolyte was applied based on calculation of the pore rate of the positive electrode, negative electrode, and separator.

More specifically, in a comparative example, the electrolyte was applied to both surfaces of the positive electrode portion and negative electrode portion, and DMC was dried, thus forming a bipolar electrode where both surfaces were permeated by the electrolyte.

In example 1, the electrolyte was applied only to the surface of the negative electrode portion, where the amount of the electrolyte was large enough to permeate the pores of the positive electrode, negative electrode, and separator. In this way, a bipolar electrode was completed in which the electrolyte was applied only to the surface of the negative electrode portion, where the amount of the electrolyte was necessary and sufficient to permeate the individual layers.

In example 2, the electrolyte was applied only to the surface of the positive electrode portion, where the amount of the electrolyte was large enough to permeate the pores of the positive electrode, negative electrode, and separator. In this way, a bipolar electrode was completed in which the electrolyte was applied only to the surface of the positive electrode portion, where the amount of the electrolyte was necessary and sufficient to permeate the individual layers.

In example 3, the electrolyte was applied only to a portion, which contacted the negative electrode portion, of one of both surfaces of the separator, which contacted the negative electrode surface, where the amount of the electrolyte was large enough to permeate the pores of the positive electrode, negative electrode, and separator. In this way, a bipolar electrode was completed in which the electrolyte was applied only to the surface that contacts the negative electrode surface of the separator, where the amount of the electrolyte was necessary and sufficient to permeate the individual layers.

In example 4, the electrolyte was applied only to a portion, which contacted the positive electrode portion, of one of both surfaces of the separator, which contacted the positive electrode surface, where the amount of the electrolyte was large enough to permeate the pores of the positive electrode, negative electrode, and separator. In this way, a bipolar electrode was completed in which the electrolyte was applied only to the surface that contacted the positive electrode surface of the separator, where the amount of the electrolyte was necessary and sufficient to permeate the individual layers.

In example 5, the electrolyte was not applied in this operation.

Similarly, in example 6, the electrolyte was not applied in this operation.

<Formation of Filling Material (Seal Portion Precursor)> A seal precursor (one-component uncured epoxy resin) was applied with a dispenser to the periphery of the electrode, or the portion of the periphery of the electrolyte application side (positive electrode surface, in cases of double-sided application) of the bipolar electrode where no electrode was applied (see FIGS. 13 and 14). In examples 5 and 6, the electrolyte was not yet applied. Accordingly, the seal precursor was applied to the positive electrode side in example 5, whereas the seal precursor was applied to the negative electrode side in example 6.

Next, the separator of 250 mm×300 mm (aramid nonwoven fabric separator: 12 μm) was arranged on the surface to which the electrolyte was applied, covering the entire stainless foil as a current collector (see FIG. 15). In this operation, the separator was arranged on the bipolar electrode, while the separator was vacuumed on a porous board connected to a vacuum pump. The porous board was implemented by a porous sintered metal board. The separator was arranged with no incorporation of bubbles, by vacuum and release, through the separator, of bubbles incorporated between the separator and the electrode. In example 5, the separator was arranged on the positive electrode side. In example 6, the separator was arranged on the negative electrode side.

More specifically, in the comparative example, the seal precursor was applied to the periphery of the positive electrode. The separator was placed on the positive electrode side, while the separator was arranged and vacuumed on the porous board.

In example 1, the seal precursor was applied to the periphery of the negative electrode. The separator was placed on the negative electrode side, while the separator was arranged and vacuumed on the porous board.

In example 2, the seal precursor was applied to the periphery of the positive electrode. The separator was placed on the positive electrode side, while the separator was arranged and vacuumed on the porous board.

In example 3, the seal precursor was applied to the periphery of the negative electrode. The separator was placed on the negative electrode side, while one of both surfaces of the separator where no electrolyte was applied was arranged and vacuumed on the porous board.

In example 4, the seal precursor was applied to the periphery of the positive electrode. The separator was placed on the positive electrode side, while one of both surfaces of the separator where no electrolyte was applied was arranged and vacuumed on the porous board.

In example 5, the electrolyte was not yet applied. In example 5, the seal precursor was applied to the periphery of the positive electrode. The separator was placed on the positive electrode side, while the separator was arranged and vacuumed on the porous board. Then, the electrolyte was applied to the arranged separator, where the amount of the electrolyte was large enough to permeate the pores of the positive electrode, negative electrode, and separator.

In example 6, the electrolyte was not yet applied. In example 6, the seal precursor was applied to the periphery of the negative electrode. The separator was placed on the negative electrode side, while the separator was arranged and vacuumed on the porous board. Then, the electrolyte was applied to the arranged separator, where the amount of the electrolyte was large enough to permeate the pores of the positive electrode, negative electrode, and separator.

Then, the seal precursor (one-component uncured epoxy resin) was applied with a dispenser to the periphery of the electrode, or the portion of the periphery of the electrolyte where no electrode was applied (the portion same as the portion where the seal precursor was applied) (see FIG. 16).

comparative example, the high polymer gel electrolyte was applied to both of the positive and negative electrodes. In examples 1 to 6, the high polymer gel electrolyte was applied to the positive electrode or negative electrode, one of both surfaces of the separator that contacted the electrode, or the outside surface of the separator. Table 1 also shows results of evaluation of discharge capacity described below, and evaluation of internal resistance.

TABLE 1

| | COMPARATIVE EXAMPLE | EXAMPLE 1 | EXAMPLE 2 | EXAMPLE 3 |
|---|---|---|---|---|
| SURFACE WHERE ELECTROLYTE IS APPLIED | BOTH SURFACES | NEGATIVE ELECTRODE ONLY | POSITIVE ELECTRODE ONLY | NEGATIVE ELECTRODE SIDE SURFACE OF SEPARATOR |
| DISCHARGE CAPACITY | 78% | 97% | 99% | 97% |
| RESISTANCE | 100% | 76% | 78% | 78% |

| | EXAMPLE 4 | EXAMPLE 5 | EXAMPLE 6 |
|---|---|---|---|
| SURFACE WHERE ELECTROLYTE IS APPLIED | POSITIVE ELECTRODE SIDE SURFACE OF SEPARATOR | OUTSIDE SURFACE OF SEPARATOR ARRANGED ON POSITIVE ELECTRODE | OUTSIDE SURFACE OF SEPARATOR ARRANGED ON NEGATIVE ELECTRODE |
| DISCHARGE CAPACITY | 98% | 99% | 98% |
| RESISTANCE | 80% | 82% | 83% |

<Setting to Magazine> With the negative electrode surface directed upward, six of prepared bipolar electrodes were set to a magazine for bipolar electrode support, which magazine was capable of holding the periphery outside of the electrode and seal portion so that the electrodes are out of contact with one another, and the direction perpendicular to the surface direction of each electrode is identical with one another (see FIG. 18).

In the lowest bipolar electrode, no seal portion and separator were arranged, and no electrolyte was applied to the positive electrode surface. In the uppermost bipolar electrode, no electrolyte was applied to the negative electrode surface.

<Installation into Vacuum Chamber> The Magazine was installed into a vacuum chamber that includes a layering part and a press and heating press part, and the vacuum chamber was vacuumed by a vacuum pump to vacuum (see FIG. 19).

<Layering of Electrodes> Under vacuum, the held bipolar electrodes were released one after another, while the magazine was moved downward toward the receiving stage, and the bipolar electrodes were layered on the receiving stage with no deviation. In this way, a bipolar battery structure is prepared in which five cells are layered (see FIG. 19).

<Press of Bipolar Battery> The bipolar battery structure was moved with the receiving stage to the press position under vacuum, and was pressed with heating for one hour at a surface pressure of 1 kg/cm$^2$, 80° C. by a hot press. In this way, the electrolyte was made plastic, the distance between the electrodes (between the positive electrode and the negative electrode) was pressed down to the thickness of the separator, and simultaneously the uncured seal portion (epoxy resin) was cured. This operation pressed the seal portion to a predetermined thickness, and further hardened the same.

<Taking Out From Vacuum Chamber> The inside of the vacuum chamber was leaked to the atmosphere pressure, and then the bipolar battery structure was taken out, thus forming a high polymer gel electrolyte type bipolar battery. Table 1 shows the surface where the high polymer gel electrolyte was applied in the comparative example and the examples. In the Evaluation 1

The following describes visual observation with the bipolar battery exploded.

The prepared bipolar battery was exploded, and the condition of incorporation of bubbles was checked by visual observation.

In the comparative example, it was observed that bubbles remain between the positive electrode and the separator.

In examples 1 to 4, there were no bubbles between the electrode and the separator. In this way, it was observed that the incorporation of bubbles was suppressed in examples 1 to 4 as compared to the comparative example.

Although a detailed mechanism is not identified, it is conceivable that if the electrolyte is applied to both surfaces of the electrode as in the comparative example, when sub-assembly units are layered together, bubbles, which are once incorporated between the electrode of one of the sub-assembly units and the separator of the other sub-assembly unit, do not escape easily, because of viscosity of the electrolyte. On the other hand, in examples 1 to 4, when sub-assembly units are layered together, the surface of one of the sub-assembly units where the electrolyte is not applied is arranged on the separator of the other sub-assembly unit. This makes it possible that since there is no viscosity between layers, sub-assembly units can be layered together while bubbles are easily removed.

Evaluation 2

The following describes evaluation about IC discharge capacity.

Discharge capacity was evaluated for the comparative example and examples 1 to 6. On the basis of the capacity estimated from the weight applied to the positive electrode, charging was performed at 21V-1C for two hours, and then 1C constant current discharging was performed at a lower limit voltage of 12.5V, and the capacity was measured. The result of measurement of the capacity is also shown in Table. 1. In Table. 1, the discharge capacity is shown in the form of the ratio of the discharge capacity (%) when a theoretical capacity that is estimated from the weight applied to the positive electrode is regarded as 100%.

As clearly understood from the result shown in Table. 1, the batteries according to examples 1 to 6 were capable of achieving discharging substantially in conformance with the theoretical value, as compared to the bipolar battery according to the comparative example.

Accordingly, it was found that with the manufacturing method according to the examples, it is possible to manufacture a bipolar battery which is free from effects of bubbles, while easily removing bubbles.

Evaluation 3

The following describes evaluation about the internal resistance when the battery is fully charged.

In the comparative example and examples 1 to 6, the battery was 2C discharged from the fully charging state (SOC100%, 21V), and the voltage was measured 10 seconds after, and the internal resistance was measured based on a fall in the voltage. Table. 1 also shows the result of resistance measurement. In Table. 1, the resistance is shown in the form of the ratio of the resistance (%) when the resistance in the comparative example is regarded as 100%.

As clearly understood from the result shown in Table. 1, the resistance of each battery according to the examples 1 to 6 was reduced as compared to the comparative example.

Accordingly, it was observed that with the manufacturing method according to the examples, bubbles were easily removed, to reduce the resistance.

As examples 1 and 2 are compared with the comparative example, it is found that the incorporation of bubbles is suppressed in the cases where layers provided with no electrolyte viscosity are layered together, and that substantially the same effects are produced in both of the case where the electrolyte is applied to the positive electrode side and the case where the electrolyte is applied to the negative electrode.

As examples 3 and 4 are compared with examples 1 and 2, it is found that substantially the same effect is produced when the electrolyte layer is formed on top of the separator.

As examples 5 and 6 are compared with examples 1 and 2, it is found that substantially the same effect is produced when the electrolyte layer is formed on the separator after the separator is arranged.

Fourth Embodiment

Figure 36:
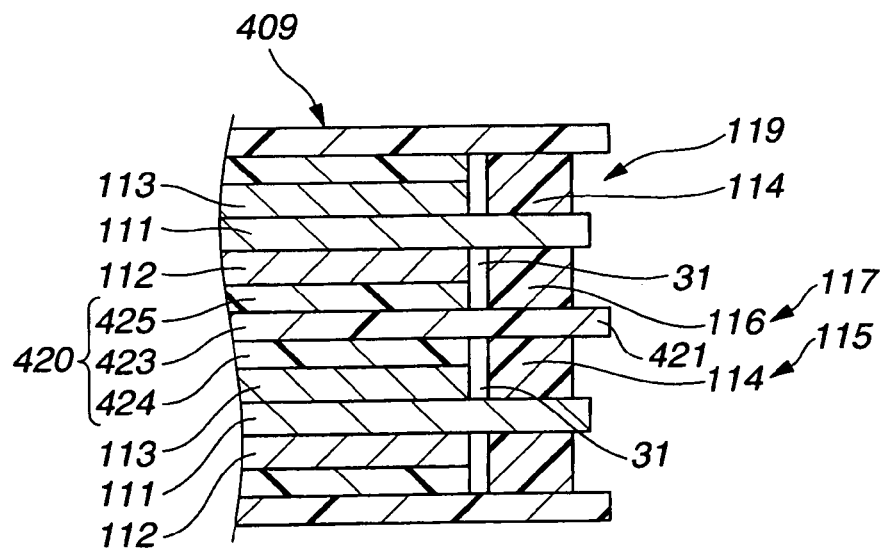
FIG. 36 is a sectional view for describing an assembly unit and an electrolyte layer in a fourth embodiment.
Figure 37A:
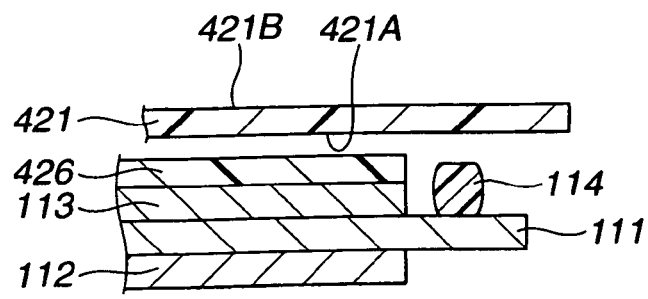
FIG. 37A is a sectional view for describing a sub-assembly unit according to the fourth embodiment.
Figure 37B:
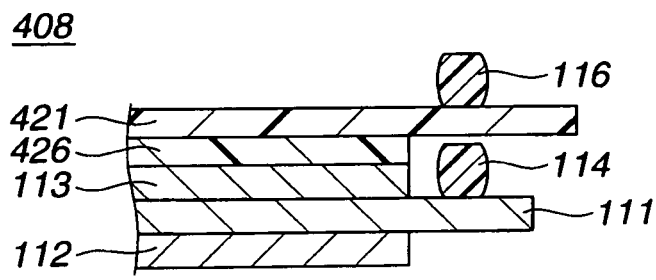
FIG. 37B is a sectional view for describing the sub-assembly unit according to the fourth embodiment.
Figure 37C:
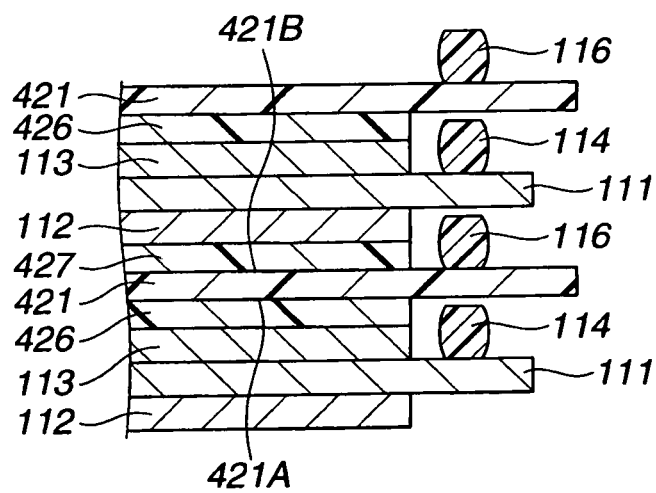
FIG. 37C is a sectional view showing a condition that sub-assembly units according to the fourth embodiment are layered together, and a liquid electrolyte is made to permeate through a separator, and exposed on a surface of a negative electrode.

FIG. 36 is a sectional view for describing an assembly unit 409 and an electrolyte layer 420 in a fourth embodiment. FIGS. 37A and 37B are sectional views for describing a sub-assembly unit 408 according to the fourth embodiment. FIG. 37C is a sectional view showing a condition that sub-assembly units 408 are layered together, and a liquid electrolyte 427 is made to permeate through a separator 421, and exposed on a surface of 112. The same characters are given to common members between the fourth embodiment and first embodiment, and part of description of them is omitted.

As described above, a bipolar battery does not function as a battery, if electrolytes in layers contact one another. Accordingly, when a bipolar battery in which an electrolyte contains an electrolytic solution is prepared, each layer is provided with a seal base material to prevent liquid junction or prevent the electrolyte in each layer from contacting one another. The liquid junction can be prevented by using a high polymer gel electrolyte as an electrolyte. However, use of a high polymer gel electrolyte leads to an increase in the battery resistance, because of a decrease in the ion conductivity as compared to liquid electrolytes. This results in a problem of decrease in the output density of the battery.

Accordingly, in the fourth embodiment, the output density is enhanced by increasing the ion conductivity, in addition to enhancement of the output density by suppression of incorporation of bubbles.

Separator 421 according to the fourth embodiment is composed of a porous separator that allows a liquid electrolyte in a high polymer gel electrolyte to pass through, but interrupts a polymer in the high polymer gel electrolyte. In the first, second and third embodiments described above, it is not excluded that the polymer in the high polymer gel electrolyte passes through separator 121. In the fourth embodiment, in addition to the construction according to the first embodiment, separator 421 is provided with a function of selectively allowing permeation of a liquid electrolyte. Namely, in the operation of forming the assembly unit, the liquid electrolyte in the high polymer gel electrolyte is made to permeate through separator 421 to the positive or negative electrode that is arranged to face the second surface 421B of separator 421. The first surface 421A of separator 421 is the surface facing the bipolar electrode 110, as in the first embodiment. Also, in addition to the construction according to the second or third embodiment, separator 421 may be provided with a function of selectively allowing permeation of a liquid electrolyte.

Generally, bipolar battery 10 according to the fourth embodiment includes a layered product that is formed by providing the bipolar electrode 110 with electrolyte layer 420 to form a unit, and layering a plurality of the units (see FIG. 36). Specifically, one of positive electrode 113 and negative electrode 112 is permeated by a high polymer gel electrolyte, whereas the other electrode contains a liquid electrolyte only.

Electrolyte layer 420 includes porous and permeable separator 421 that allows a liquid electrolyte in a high polymer gel electrolyte to pass through, but interrupts a polymer in the high polymer gel electrolyte. Electrolyte layer 420 includes: a first layer 424 containing an electrolyte that conducts ions between separator 421 and one of positive electrode 113 and negative electrode 112; a second layer 423 where separator 421 is permeated by an electrolyte; and a third layer 425 containing an electrolyte that conducts ions between separator 421 and the other of positive electrode 113 and negative electrode 112. First layer 424 is formed by applying the high polymer gel electrolyte to one of positive electrode 113 and negative electrode 112. Second layer 423 is formed by making the separator 421 permeated by the electrolyte in the high polymer gel electrolyte applied to the one electrode. Third layer 425 is formed by making the liquid electrolyte in the high polymer gel electrolyte, which is applied to the one electrode, to permeate through separator 421, and dispose the same on the surface of the other electrode (see FIG. 36). The electrolytes in first and second layers 424, 423 are in the form of a liquid or semi-solid gel electrolyte, whereas the electrolyte in third layer 425 is in the form of a liquid electrolyte.

In manufacturing the bipolar battery 10, bipolar electrode 110 and separator 421 are prepared first. Next, a high polymer gel electrolyte 426 is applied to one of positive electrode 113 and negative electrode 112 (see FIG. 37A). Next, separator 421 is layered on the surface of the electrode applied with high polymer gel electrolyte 426, thus forming the sub-assembly unit 408 (see FIG. 37B). Then, a plurality of sub-assembly units 408 are layered (see FIG. 37C), and liquid electrolyte 427 in high polymer gel electrolyte 426 is made to permeate through separator 421 to the other electrode, thus forming the assembly unit 409 (see FIG. 36). FIG. 37C shows a condition that sub-assembly units 408 are layered together, and liquid electrolyte 427 is made to permeate through separator 421, and exposed on a surface of negative electrode 112.

In the operation of forming the assembly unit 409, electrolyte layer 420 is formed which includes: first layer 424 containing an electrolyte that conducts ions between the one electrode and separator 421; second layer 423 in which separator 421 is permeated by an electrolyte; and third layer 425 containing an electrolyte that conducts ions between the other electrode and separator 421 (see FIG. 36).

In this embodiment, high polymer gel electrolyte 426 is applied to positive electrode 113, and liquid electrolyte 427 in high polymer gel electrolyte 426 is made to permeate through separator 421 to negative electrode 112. Accordingly, positive electrode 113 corresponds to "one electrode", and negative electrode 112 corresponds to "other electrode". As described above, the ratio between the polymer and electrolytic solution constituting the high polymer gel electrolyte is wide-ranging. Where containing 100% of the polymer indicates a full solid polyelectrolyte, and containing 100% of the electrolytic solution indicates a liquid electrolyte, every intermediate is a high polymer gel electrolyte.

The function of selectively allowing permeation of a liquid electrolyte, which is provided to separator 421, is implemented by defining the range of the diameter of pores of separator 421. As in the first embodiment, separator 421 is made of a material such as porous PE (polyethylene) that is electrolyte-permeable, but not so limited. Separator 421 may be made of another polyolefin such as PP (polypropylene), a layered material having three layers of PP/PE/PP, polyamide, polyimide, aramid, and a nonwoven fabric made of cotton, rayon, acetate, nylon, polyester, or aramid, for example. In general, the diameter of pores of a typical porous membrane separator are from 0.1 µm to 0.5 µm, and the diameter of pores of a typical nonwoven fabric separator are from 1 µm to 5 µm, which may be selected depending on the size of particles of the polymer.

The particle diameter of a liquid electrolyte is very small, and below 0.01 µm, although depending on the kind of the liquid electrolyte. Accordingly, a liquid electrolyte can easily permeate through a porous separator or nonwoven fabric separator.

Although the size of a polymer particle in a high polymer gel electrolyte is difficult to define generally, the size is assumed to become about 1 µm, with a polymer chain extending straight. In this case, the size of the polymer particle is between the pore diameter of a nonwoven fabric separator and the pore diameter of a porous membrane separator. Accordingly, if the nonwoven fabric separator is employed, both of the polymer and liquid electrolyte permeate through the separator. If the porous membrane separator is employed, only the liquid electrolyte permeates through the separator, but the polymer does not permeate through the separator. However, it is not excluded that a nonwoven fabric is used as a material of a separator, but a nonwoven fabric can also be provided with a function of selectively allowing permeation of a liquid electrolyte by adjusting the polymer particle size. The polymer particle size can be adjusted with the molecular weight. As the molecular weight increases, the polymer particle size increases. Accordingly, if the molecular weight is increased to increase the polymer particle size above 5 µm, a nonwoven fabric can be used to selectively allow permeation of a liquid electrolyte only. Since it is difficult to measure the size of a polymer particle, a suitable molecular weight is determined by a trial and error process in which the polymer molecular weight is varied, and the function of selectively allowing permeation of a liquid electrolyte is evaluated.

As shown in FIGS. 37A to 37C, as in the first embodiment, in the operation of forming the sub-assembly unit 408, the thickness of first seal 114 arranged on top of current collector 111 is set below the sum of the thickness of positive electrode 113 and the thickness of high polymer gel electrolyte 426 exposed on the surface of positive electrode 113. Moreover, the thickness of second seal 116 arranged on top of separator 421 is set below the sum of the thickness of negative electrode 112 and the thickness of liquid electrolyte 427 made to permeate through separator 421, and exposed on the surface of negative electrode 112. This size setting forms a clearance between separator 121 and first seal 114, when separator 121 is arranged. This suppresses the incorporation of bubbles in the internal space surrounded by first seal 114 (see FIGS. 37A and 37B). When separator 421 is arranged, air can be incorporated between separator 421 and high polymer gel electrolyte 426, but the air passes through permeable separator 421 itself, so that it does not remain in the form of bubbles.

Moreover, when sub-assembly units 408 are layered together, and electrolyte 427 is made to permeate through separator 421 and exposed on the surface of negative electrode 112, a clearance is formed between current collector 111 and second seal 116. This suppresses the incorporation of bubbles in the internal space surrounded by second seal 116 (see FIG. 37C).

In this way, when bipolar electrode 110 is layered, the incorporation of bubbles 30 is suppressed, so that it becomes unnecessary to remove bubbles, for example, by squeezing from separator 421, during layering. This eliminates such a troublesome operation, and serves for mass production of bipolar battery 10.

Incidentally, the amount of high polymer gel electrolyte 426 exposed on the surface of positive electrode 113 includes an amount for forming the first layer 424, an amount made to permeate separator 421, and an amount made to permeate through separator 421 to negative electrode 112. For this reason, the thickness of high polymer gel electrolyte 426 is larger than that of first layer 424. The amount of liquid electrolyte 427 exposed on the surface of negative electrode 112 includes an amount for forming the third layer 425, and an amount made to permeate negative electrode 112. For this reason, the thickness of liquid electrolyte 427 is larger than that of third layer 425, until negative electrode 112 is permeated adequately and uniformly by the electrolyte.

By layering the sub-assembly units 408, first and second seals 114, 116 are arranged to surround positive electrode 113 and negative electrode 112 in the space between current collector 111 and electrolyte layer 420.

Even if layered product 108a of sub-assembly units 408 is pressed flatly, the pressure is not fully applied to the place where first and second seals 114, 116 are arranged. This may cause inadequate sealing. Accordingly, in the operation of forming the assembly unit 409, first and second seals 114, 116 are pressed in the direction in which sub-assembly unit 408 are layered, so as to bring current collector 111, separator 421, and first and second seals 114, 116 into tight contact, thus forming the sealing part 119 (see FIG. 6 of the first embodiment). The construction of bipolar battery 10 according to the fourth embodiment is not specifically limited, but may be implemented by materials commonly known and used in common lithium ion batteries, except those specified, as in the first embodiment. Accordingly, description is omitted.

Sub-assembly unit 408 according to the fourth embodiment is formed by a process similar to the first embodiment. Specifically, the sub-assembly forming operation includes:

an electrode forming operation; an electrolyte arrangement operation; an operation of arranging the first seal 114 on current collector 111; a separator arrangement operation; and an operation of arranging the second seal 116 on separator 121 (see FIG. 9 of the first embodiment).

Figure 38:
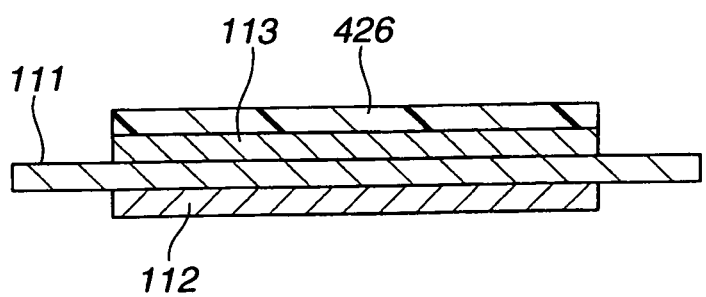
FIG. 38 is a sectional view for describing an electrolyte arrangement operation in the fourth embodiment.
Figure 39:
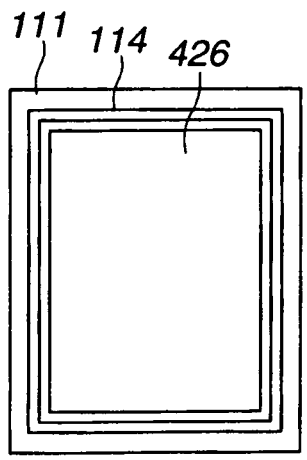
FIG. 39 is a plan view for describing an operation of arranging a first seal on a current collector in the fourth embodiment.
Figure 40:
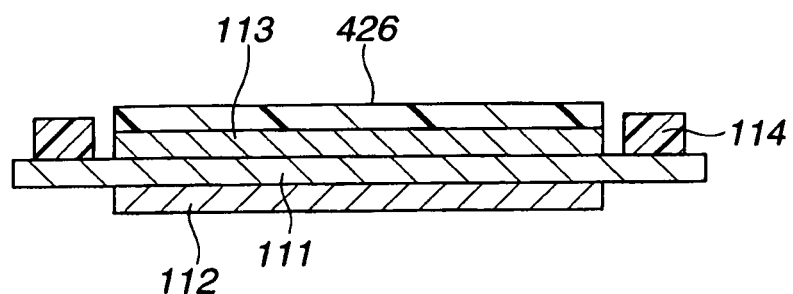
FIG. 40 is a sectional view for describing the operation of arranging the first seal on the current collector in the fourth embodiment.
Figure 42:
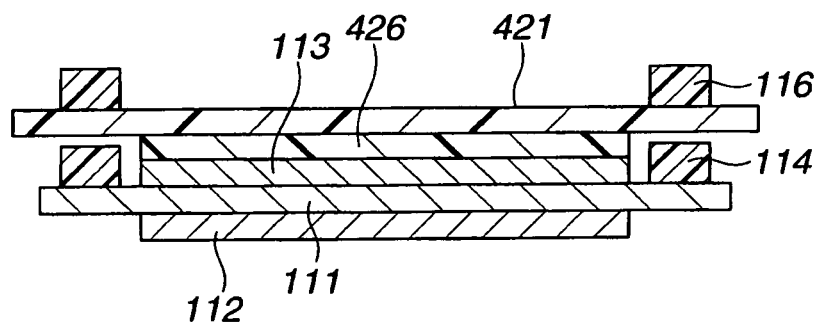
FIG. 42 is a sectional view for describing an operation of arranging a second seal on a separator in the fourth embodiment.
Figure 43:
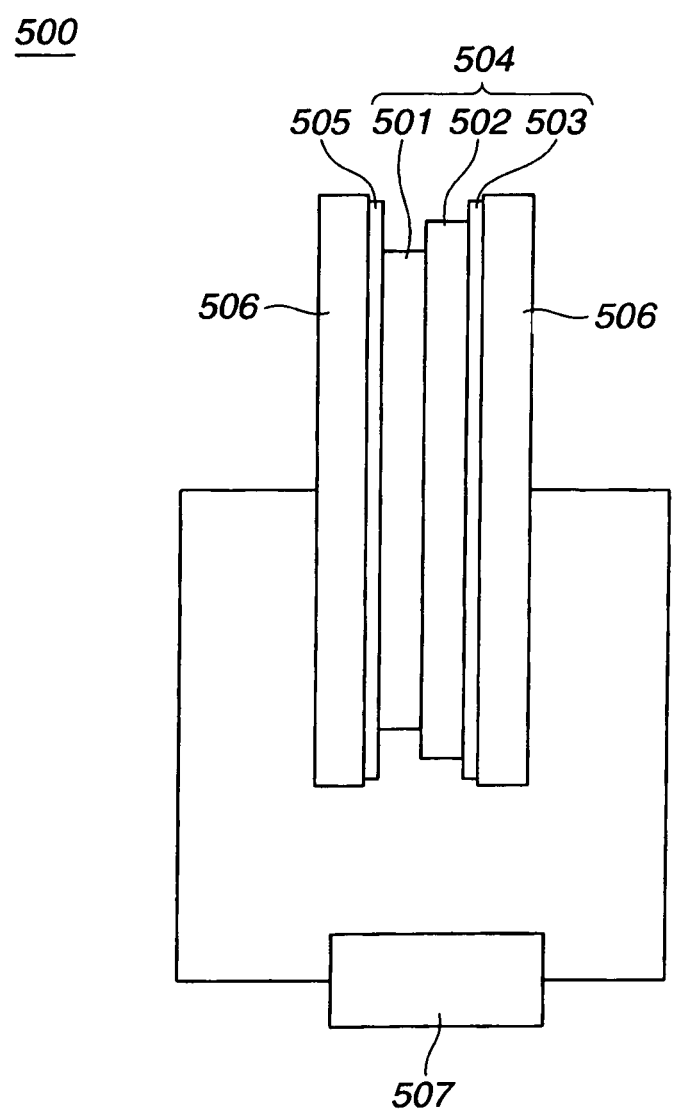
FIG. 43 is a principle diagram showing a measurement device for measuring ion diffusion in an electrode.

FIG. 38 is a sectional view for describing an electrolyte arrangement operation in the fourth embodiment. FIGS. 39 and 40 are a plan view and a sectional view for describing an operation of arranging the first seal 114 on current collector 111 in the fourth embodiment. FIG. 43 is a sectional view for describing a separator arrangement operation in the fourth embodiment. FIG. 42 is a sectional view for describing an operation of arranging the second seal 116 on separator 121 in the fourth embodiment.

The electrode forming operation is similar to the first embodiment. Accordingly, description is omitted.

In the electrolyte arrangement operation, one of positive electrode 113 and negative electrode 112 is applied with such an amount of high polymer gel electrolyte 426 as being exposed on the surface of the one electrode. In the fourth embodiment, in the operation of applying the electrolyte, high polymer gel electrolyte 426 is applied only to positive electrode 113 that serves as "one electrode", and no electrolyte is applied to negative electrode 112 that serves as "other electrode" (see FIG. 38).

In the operation of applying the electrolyte, the amount of high polymer gel electrolyte 426 applied to positive electrode 113 is equal to the sum of an amount held by positive electrode 113, an amount made to permeate separator 421, and an amount made to permeate through separator 421 to negative electrode 112. Specifically, the amount held by positive electrode 113 includes an amount made to permeate positive electrode 113, and an amount exposed on the surface of positive electrode 113 to from the first layer 424. The amount made to permeate separator 421 specifically includes an amount made to permeate separator 421 to form the second layer 423. The amount made to permeate through separator 421 to negative electrode 112 specifically includes an amount made to permeate negative electrode 112, and an amount exposed on the surface of negative electrode 112 to form the third layer 425.

In the fourth embodiment, high polymer gel electrolyte 426 is, for example, composed of 90 wt % of an electrolytic solution, and 10 wt % of a host polymer, with a viscosity adjusting solvent added to provide a suitable viscosity for application.

The electrolytic solution contains an organic solvent composed of PC (propylene carbonate) and EC (ethylene carbonate), and a lithium salt ($LiPF_6$) as a supporting salt. The concentration of the lithium salt is 1M, for example.

The host polymer is, for example, PVDF—HFP (a copolymer of polyvinylidene fluoride and hexafluoropropylene) containing 10% of a copolymer of HEP (hexafluoropropylene). The viscosity adjusting solvent is DMC (dimethyl carbonate). The viscosity adjusting solvent is not limited to DMC.

In the operation of arranging the first seal 114 on current collector 111, first seal 114 is arranged to extend at the exposed periphery of the positive electrode side of current collector 111 and surround the positive electrode 113 (see FIGS. 39 and 40). The thickness of first seal 114 is set below the sum of the thickness of positive electrode 113 and the thickness of high polymer gel electrolyte 426 exposed on the surface of positive electrode 113 (see FIG. 37A).

In the separator arrangement operation, separator 421 is arranged to cover the entire surface of the side of positive electrode 113 (see FIG. 43). Separator 421 is porous PE.

When separator 421 is arranged, a clearance is formed between separator 421 and first seal 114. This prevents bubbles from remaining in the internal space surrounded by first seal 114. Air which is incorporated between separator 421 and high polymer gel electrolyte 426 when separator 421 is arranged, passes through separator 421 itself, so that it does not remain in the form of bubbles.

In the operation of arranging the second seal 116 on separator 421, second seal 116 is arranged on top of separator 421 (see FIG. 42). The thickness of second seal 116 is set below the sum of the thickness of negative electrode 112, and the thickness of liquid electrolyte 427 that is made to permeate through separator 421, and exposed on the surface of negative electrode 112. Second seal 116 is positioned so that second seal 116 corresponds to the position of first seal 114 (second seal 116 overlaps with first seal 114 through separator 421) (see FIG. 42). First and second seals 114, 116 are, for example, one-component uncured epoxy resins.

The formation of sub-assembly unit 408 is completed by the foregoing operations. In sub-assembly unit 408, separator 421 is arranged on the surface of positive electrode 113 to which the electrolyte is applied. At the stage when sub-assembly unit 408 is formed, the electrolyte is not exposed on the surface of negative electrode 112. Accordingly, it is unnecessary to place on the surface of negative electrode 112 a protection film for preventing the electrolyte from being touched. Therefore, it becomes possible to easily deal with sub-assembly unit 408 without such a protection film.

Assembly unit 409 is formed by a process similar to the first embodiment. Specifically, the assembly unit forming operation includes a sub-assembly unit setting operation, a layering operation, a press operation, a seal permeation operation, an interface forming operation, an initial charging operation, and bubble releasing operation (see FIG. 17 of the first embodiment).

In the sub-assembly unit setting operation, a plurality of sub-assembly units 408 are set to a magazine 150 one after another (see FIG. 18 of the first embodiment).

In the layering operation, magazine 150 is arranged inside a vacuum operating device 160, and a layered product 108a of sub-assembly units 408 is formed under vacuum (see FIG. 19 of the first embodiment). The degree of vacuum is from $0.2 \times 10^5$ to $0.5 \times 10^5$ Pa, for example. In cases where both of positive electrode 113 and negative electrode 112 are applied with a high polymer gel electrolyte, the electrode of the upper sub-assembly unit where the high polymer gel electrolyte is exposed, is arranged on the separator of the lower sub-assembly unit, while the sub-assembly units are layered. The high polymer gel electrolyte which is viscous can trap bubbles. In contrast, in the fourth embodiment, when sub-assembly units 408 are layered, separator 421 is arranged on the surface of negative electrode 112 on which the high polymer gel electrolyte is not exposed. Accordingly, no bubbles are trapped by the high polymer gel electrolyte which is viscous. Moreover, because of the vacuum condition, air incorporated between separator 421 and the electrolyte on the surface of positive electrode 113 when separator 421 is arranged can escape easily through separator 421 itself. This further suppresses the incorporation of bubbles.

In the press operation, layered product 108a is pressed in the direction of layering the sub-assembly units 408, by press plate 173 and base plate 171, with the condition of vacuum maintained (see FIG. 19 of the first embodiment). The press condition is from $1 \times 10^6$ to $2 \times 10^6$ Pa, for example. The press operation and the negative pressure inside the vacuum operating device 160 causes the high polymer gel electrolyte 426, which is applied only to positive electrode 113, to permeate positive electrode 113, and also permeate separator 421. Liquid electrolyte 427 in high polymer gel electrolyte 426 further permeates through separator 421 to the side of negative electrode 112, and permeate negative electrode 112. On the surface of positive electrode 113 is exposed an amount of the gel electrolyte needed to form the first layer 424. Separator 421 is permeated by an amount of the gel electrolyte needed to form the second layer 423. Also, on the surface of negative electrode 112 is exposed an amount of liquid electrolyte 427 needed to form the third layer 425. The permeation of high polymer gel electrolyte 426 and liquid electrolyte 427 in high polymer gel electrolyte 426 described above is partly achieved in the layering operation.

Positive electrode 113 is permeated by high polymer gel electrolyte 426, whereas negative electrode 112 is permeated only by liquid electrolyte 427. Accordingly, the battery resistance is lowered because of an increase in the ion conductivity, as compared to the case where both of electrodes 113, 112 are permeated by the high polymer gel electrolyte.

Since the polymer of high polymer gel electrolyte 426 is of a thermoplastic type, it is preferable to heat the plurality of layered sub-assembly units 408, namely, layered product 108a (up to 80° C., for example). When heated, the gel component of high polymer gel electrolyte 426 is softened so as to make it possible to separate the liquid electrolyte from the polymer. This makes it possible to make the electrolyte permeate each of positive electrode 113 and separator 421 adequately and uniformly, and further make liquid electrolyte 427 permeate negative electrode 112 adequately and uniformly. As compared to the case based only on pressing, it is possible to promote the permeation of electrolytes 426, 427.

In order to suppress the incorporation of bubbles in the internal space surrounded by first and second seals 114, 116, the thickness of first seal 114 is set smaller than the sum of the thicknesses of positive electrode 113 and high polymer gel electrolyte 426 exposed on the surface of positive electrode 113, whereas the thickness of second seal 116 is set smaller than the sum of the thicknesses of negative electrode 112 and liquid electrolyte 427 exposed on the surface of negative electrode 112. Under this condition, it is possible that when layered product 108a is pressed flatly, the pressing force is not adequately transmitted to a part to be charged (where first and second seals 114, 116 are arranged). This may cause inadequate sealing.

Accordingly, a press means 280 is used, and a seal permeation operation for mainly pressing the first and second seals 114, 116 in layered product 108a, so that first and second seals 114, 116 are made to adequately permeate separator 121 (see FIG. 20 of the first embodiment). This forms the sealing part 119 (see FIG. 6 of the first embodiment).

In the seal layer forming operation, layered product 108a is arranged in an oven 190, and heated. As a result, first and second seals 114, 116, which are included in layered product 108a, are cured by heating, so as to form the first and second seal layers 115, 117 (see FIG. 36). The heating condition is 80° C., for example. The method of heating the layered product 108a is not specifically limited to the form using an oven.

In the interface forming operation, layered product 108a is arranged on press means 180, and pressed under heating (see FIG. 22 of the first embodiment). The permeation of the gel electrolyte adequately progresses so as to form the first layer 424 containing the electrolyte conducting ions between positive electrode 113 and separator 421, the second layer 423 where the electrolyte is made to permeate separator 421, and the third layer 425 containing the electrolyte conducting ions between negative electrode 112 and separator 421 (see FIG. 36). The heating and pressing conditions are 80° C. and from $1 \times 10^6$ to $2 \times 10^6$ Pa, for example. In this way, sub-assembly units 408 are layered together to obtain assembly unit 409.

The initial charging operation and bubble releasing operation are similar to the first embodiment. Accordingly, description is omitted.

The seal layer forming operation and interface forming operation may be integrated with suitable selection of high polymer gel electrolyte 426 and first and second seals 114, 116. Simultaneous implementation of curing of first and second seals 114, 116 and completeness of electrolyte layer 420 makes it possible to shorten the period of the manufacturing process. Between the seal layer forming operation and interface forming operation may be added an operation of attaching tabs (lead wires) for monitoring the electric potential of each bipolar cell.

As described above, the fourth embodiment serves to enhance the output density by suppression of the incorporation of bubbles, similar to the first embodiment. In addition, in the case of the fourth embodiment, positive electrode 113 is permeated by high polymer gel electrolyte 426, whereas negative electrode 112 is permeated only by liquid electrolyte 427. Accordingly, the battery resistance is lowered because of an increase in the ion conductivity, as compared to the case where both of electrodes 113, 112 are permeated by the high polymer gel electrolyte. In this way, the fourth embodiment can provide a bipolar battery manufacturing method of manufacturing a bipolar battery superior in performance, and such a bipolar battery, wherein the output density is enhanced by increase in the ion conductivity.

Bipolar battery 10 can be prevented from liquid leaking, liquid junction, and thereby made highly reliable, because the high polymer gel electrolyte 426 is of a thermoplastic type containing the electrolytic solution in the polymer skeleton. The high polymer gel electrolyte 426 is not limited to thermoplastic types, but may be of a thermosetting type. In such cases, it is possible to cure the electrolyte layer 420 by pressing under heating, so as to prevent liquid leaking and liquid junction.

In the press operation and interface forming operation, the contact pressure is not limited to from $1 \times 10^6$ to $2 \times 10^6$ Pa, but may be set in consideration of physical properties such as the strength of the material of cell part 100. In the seal layer forming operation, the temperature after heating is not limited to 80° C., but may be preferably from 60° C. to 150° C. in consideration of the heat resistance of the electrolytic solution and the thermosetting temperatures of first seal 114 (first seal layer 115) and second seal 116 (second seal layer 117), for example.

Although liquid electrolyte 427 is contained in negative electrode 112 in the embodiment, it is preferable that one of positive electrode 113 and negative electrode 112 in which ion diffusion is lower contains a liquid electrolyte only. This is because it is possible to enhance the output density of the battery by increasing the ion conductivity of the electrode where ion diffusion is lower, into balance with the ion conductivity of the other electrode, by permeation of a liquid electrolyte.

In general, an electrode where ion diffusion is lower is an electrode which has a thicker membrane and a longer distance, or an electrode where the volume of pores capable of holding an electrolyte is smaller. Accordingly, it is preferable that one of positive electrode 113 and negative electrode 112 which has a thicker membrane or where the volume of pores capable of holding an electrolyte is smaller contains a liquid electrolyte only. This is because it is possible to enhance the output density of the battery.

FIG. 43 is a principle diagram showing a measurement device for measuring ion diffusion in an electrode.

The ion diffusion depends on the membrane thickness and pore volume of the electrode, and also on the kinds of active materials and electrolytes. Accordingly, a measurement device 500 as shown in FIG. 43 is used to determine which one of the positive and negative electrodes is an electrode where ion diffusion is lower.

As shown in the figure, an electrode 501 as a target of evaluation, an electrolyte 502, and a Li metal 503 are layered together, to prepare a test cell 504 for each of positive and negative electrodes. Except the electrode, an identical construction (cell area, electrolyte, separator, current collector 505, Li metal, for example) is used. It is possible to determine which one of the positive and negative electrodes is an electrode where ion diffusion is lower, by holding the prepared test cell 504 between a pair of stainless plates 506, performing 1 kHz alternating current impedance measurement, and measuring the diffusion of Li ion. The measurement is performed with an alternating current impedance meter 507 (for example, mΩ HiTESTER (by HIOKI E. E. CORPORATION)).

Modification of Fourth Embodiment

In the fourth embodiment described above, liquid electrolyte 427 in high polymer gel electrolyte 426 applied to positive electrode 113 is made to permeate negative electrode 112, but the present invention is not so limited. For example, in the operation of applying the high polymer gel electrolyte 426, negative electrode 112 which is the other electrode may be applied with such an amount of a liquid electrolyte as permeating the negative electrode 112 but not exposed on the surface of negative electrode 112. The amount of high polymer gel electrolyte 426 applied to positive electrode 113 is equal to the sum of an amount held by positive electrode 113, an amount made to permeate separator 421, and an amount made to permeate through separator 421 to negative electrode 112. The amount made to permeate through separator 421 to negative electrode 112 is equal to the amount produced by subtracting the amount applied beforehand to negative electrode 112, as compared to the embodiment described above.

Specifically, in the electrolyte arrangement operation (see FIG. 38), a liquid electrolyte is applied to and made to permeate negative electrode 112, for example, by a micropipette.

The liquid electrolyte includes an organic solvent composed of PC (propylene carbonate) and EC (ethylene carbonate), a lithium salt (LiPF$_6$) as a supporting salt, and a small amount of a surfactant. The concentration of the lithium salt is 1M, for example.

The organic solvent is not limited to PC and EC, but may be another cyclic carbonate, a chain carbonate such as dimethyl carbonate, or an ether such as tetrahydrofuran. The lithium salt is not limited to LiPF$_6$, but may be another inorganic acid anionic salt, or an organic acid anionic salt such as LiCF$_3$SO$_3$.

Also in such a modification, since negative electrode 112 is permeated only by liquid electrolyte 427, the battery resistance is lowered because of an increase in the ion conductivity, as compared to the case where both of electrodes 113, 112 are permeated by the high polymer gel electrolyte. Moreover, at the stage when sub-assembly unit 408 is formed, the electrolyte is not exposed on the surface of negative electrode 112. Accordingly, it is unnecessary to place on the surface of negative electrode 112 a protection film for preventing the electrolyte from being touched. Therefore, it becomes possible to easily deal with sub-assembly unit 408 without such a protection film. When sub-assembly unit 408 is layered, separator 421 is arranged on the surface of negative electrode 112 on which the electrolyte is not exposed. Accordingly, bubbles are not incorporated by the viscous gel electrolyte.

Examples

The following describes examples related to the fourth embodiment. Bipolar batteries were prepared as follows.

<Preparation of Bipolar Electrode> The positive electrode slurry was prepared by adding acetylene black as a conductivity aid (5 wt %), polyvinylidene fluoride (PVDF) as a binder (10 wt %), and N-methyl-2-pyrrolidone (NMP) as a slurry viscosity adjusting solvent to LiMn$_2$O$_4$ (85 wt %, with an average particle size of 15 μm) as a positive active material, until the positive electrode slurry had a viscosity suitable for the application operation. The positive electrode slurry was applied to one surface of a stainless steel foil (thickness of 20 μm) as a current collector, and dried, thus forming the positive electrode.

The negative electrode slurry was prepared by adding PVDF as a binder (10 wt %), and NMP as a slurry viscosity adjusting solvent to hard carbon as a negative active material (90 wt %, with an average particle size of 20 μm), until the negative electrode slurry had a viscosity suitable for the application operation. The negative electrode slurry was applied to a surface of the stainless steel foil that was opposite to the surface to which the positive electrode was applied, and dried, thus forming the negative electrode.

The positive and negative electrodes were formed on respective surfaces of the stainless foil as a current collector, thus forming a bipolar electrode. The bipolar electrode was pressed with a heating roll press. The thickness and porosity of each electrode after pressing are shown in Table 2 described below.

The bipolar electrode was cut into 240 mm×290 mm, and the 20 mm peripheries of the positive and negative electrodes were removed to expose a surface of the stainless foil as a current collector. In this way, the bipolar electrode was prepared with the electrode surface of 200 mm×250 mm, in which 20 mm of the stainless foil as a current collector was exposed at the periphery.

<Formation of High Polymer Gel Electrolyte> A pre-gel electrolyte was prepared by adding PVDF—HFP (10 wt %) containing 10% of a copolymer of HEP as a host polymer, and DMC as a viscosity adjusting solvent to an electrolytic solution (90 wt %) containing an organic solvent composed of PC and EC, and 1M of LiPF$_6$, until it had a viscosity suitable for the application operation. The high polymer gel electrolyte was applied to the positive electrode portion, the negative electrode portion, the surface of the separator on the positive electrode side, or the surface of the separator on the negative electrode side, as shown in Table 2, and DMC was dried, so as to complete a bipolar electrode that was permeated by a high polymer gel electrolyte. The adequate amount of the electrolyte was applied based on calculation of the pore rate of the positive electrode, negative electrode, and separator. The separator is implemented by a porous membrane separator that has a pore diameter of from 0.1 μm to 0.5 μm, and a function of selectively allowing permeation of a liquid electrolyte.

Figure 41:
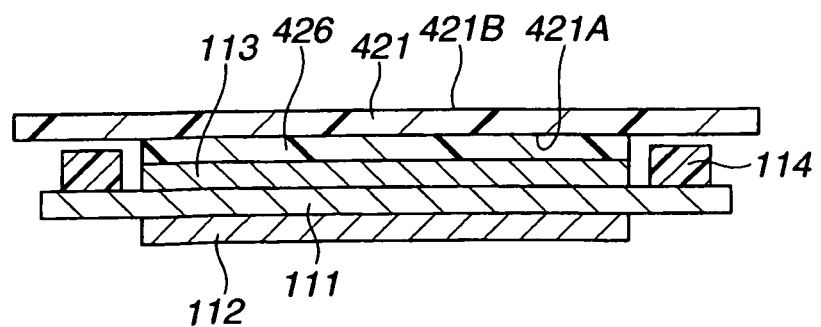
FIG. 41 is a sectional view for describing a separator arrangement operation in the fourth embodiment.

<Formation of Filling Material (Seal Portion Precursor)> A seal precursor (one-component uncured epoxy resin) was applied with a dispenser to the periphery of the electrode, or the portion of the periphery of the electrolyte application side (positive electrode surface, in cases of double-sided application) of the bipolar electrode where no electrode was applied (the portion same as the portion where the seal precursor was applied) (see FIGS. 39 and 40). Next, the separator of 250 mm×300 mm (aramid nonwoven fabric separator: 12 μm) was arranged on the surface to which the electrolyte was applied, covering the entire stainless foil as a current collector (see FIG. 41).

Then, the seal precursor (one-component uncured epoxy resin) was applied with a dispenser to the periphery of the electrode, or the portion of the periphery of the electrolyte where no electrode was applied (see FIG. 42).

<Setting to Magazine> With the negative electrode surface directed upward, six of prepared bipolar electrodes were set to a magazine for bipolar electrode support, which magazine was capable of holding the periphery outside of the electrode and seal portion so that the electrodes are out of contact with one another, and the direction perpendicular to the surface direction of each electrode is identical with one another (see FIG. 18 of the first embodiment).

In the lowest bipolar electrode, no seal portion and separator were arranged, and no electrolyte was applied to the positive electrode surface. In the uppermost bipolar electrode, no electrolyte was applied to the negative electrode surface.

<Installation into Vacuum Chamber> The magazine was installed into a vacuum chamber that includes a layering part and a press and heating press part, and the vacuum chamber was vacuumed by a vacuum pump to vacuum (see FIG. 19 of the first embodiment).

<Layering of Electrodes> Under vacuum, the held bipolar electrodes were released one after another, while the magazine was moved downward toward the receiving stage, and the bipolar electrodes were layered on the receiving stage with no deviation. In this way, a bipolar battery structure is prepared in which five cells are layered (see FIG. 19 of the first embodiment).

<Press of Bipolar Battery> The bipolar battery structure was moved with the receiving stage to the press position under vacuum, and was pressed with heating for one hour at a surface pressure of 1 kg/cm$^2$, 80° C. by a hot press. In this way, the electrolyte was made plastic, the distance between the electrodes (between the positive electrode and the negative electrode) was pressed down to the thickness of the separator, and simultaneously the uncured seal portion (epoxy resin) was cured. This operation pressed the seal portion to a predetermined thickness, and further hardened the same.

<Taking Out From Vacuum Chamber> The inside of the vacuum chamber was leaked to the atmosphere pressure, and then the bipolar battery structure was taken out, thus forming a high polymer gel electrolyte type bipolar battery.

Table 2 shows the thickness and porosity of each electrode, and the surface where the high polymer gel electrolyte was applied, in the comparative example and the examples. In the comparative example, the high polymer gel electrolyte was applied to both of the positive and negative electrodes. In examples 1 to 10, the high polymer gel electrolyte was applied only to the positive electrode or negative electrode. In example 11, the high polymer gel electrolyte was applied only to one of both surfaces of the separator in contact with the positive electrode surface, specifically, a portion in contact with the positive electrode portion, wherein the amount of the high polymer gel electrolyte is large enough to permeate the pores of the positive electrode, negative electrode, and separator. In example 12, the high polymer gel electrolyte was applied only to one of both surfaces of the separator in contact with the negative electrode surface, specifically, a portion in contact with the negative electrode portion, wherein the amount of the high polymer gel electrolyte is large enough to permeate the pores of the positive electrode, negative electrode, and separator. An electrolyte application surface is a surface applied with a high polymer gel electrolyte. Since the liquid electrolyte permeates through the porous separator to the opposite electrode, the liquid electrolyte is positioned at the electrode opposite to the electrolyte application surface.

TABLE 2

|  | COMPARATIVE EXAMPLE | EXAMPLE 1 | EXAMPLE 2 | EXAMPLE 3 |
|---|---|---|---|---|
| THICKNESS OF POSITIVE ELECTRODE [μm] | 35 | 35 | 35 | 40 |
| POROSITY OF POSITIVE ELECTRODE [%] | 45 | 45 | 45 | 45 |
| THICKNESS OF NEGATIVE ELECTRODE [μm] | 35 | 35 | 35 | 38 |
| POROSITY OF NEGATIVE ELECTRODE [%] | 45 | 45 | 45 | 45 |
| ELECTROLYTE APPLICATION SURFACE | BOTH SURFACES | POSITIVE ELECTRODE ONLY | NEGATIVE ELECTRODE ONLY | POSITIVE ELECTRODE ONLY |
| RESISTANCE | 100% | 79% | 80% | 85% |

|  | EXAMPLE 4 | EXAMPLE 5 | EXAMPLE 6 | EXAMPLE 7 | EXAMPLE 8 |
|---|---|---|---|---|---|
| THICKNESS OF POSITIVE ELECTRODE [μm] | 40 | 38 | 38 | 35 | 35 |
| POROSITY OF POSITIVE ELECTRODE [μm] | 45 | 45 | 45 | 40 | 40 |
| THICKNESS OF NEGATIVE ELECTRODE [%] | 38 | 40 | 40 | 35 | 35 |
| POROSITY OF NEGATIVE ELECTRODE [%] | 45 | 45 | 45 | 45 | 45 |
| ELECTROLYTE APPLICATION SURFACE | NEGATIVE ELECTRODE ONLY | POSITIVE ELECTRODE ONLY | NEGATIVE ELECTRODE ONLY | POSITIVE ELECTRODE ONLY | NEGATIVE ELECTRODE ONLY |
| RESISTANCE | 81% | 82% | 86% | 87% | 83% |

TABLE 2-continued

|  | EXAMPLE 9 | EXAMPLE 10 | EXAMPLE 11 | EXAMPLE 12 |
|---|---|---|---|---|
| THICKNESS OF POSITIVE ELECTRODE [μm] | 35 | 35 | 35 | 35 |
| POROSITY OF POSITIVE ELECTRODE [μm] | 45 | 45 | 45 | 45 |
| THICKNESS OF NEGATIVE ELECTRODE [%] | 35 | 35 | 35 | 35 |
| POROSITY OF NEGATIVE ELECTRODE [%] | 40 | 40 | 45 | 45 |
| ELECTROLYTE APPLICATION SURFACE | POSITIVE ELECTRODE ONLY | NEGATIVE ELECTRODE ONLY | POSITIVE ELECTRODE SIDE SURFACE OF SEPARATOR | NEGATIVE ELECTRODE SIDE SURFACE OF SEPARATOR |
| RESISTANCE | 82% | 88% | 79% | 79% |

Evaluation

Discharge capacity was evaluated for the comparative example and examples 1 to 10. On the basis of the capacity estimated from the weight applied to the positive electrode, charging was performed at 21V-1C for two hours, and then resistance measurement was performed. Discharging was performed at 200 mA, the voltage was measured five seconds after, and the resistance was measured based on a fall in the voltage. Table. 2 also shows the result of resistance measurement. In Table. 2, the resistance is shown in the form of the ratio of the resistance (%) when the resistance in the comparative example is regarded as 100%.

As clearly understood from the result shown in Table. 2, the resistance of each battery according to examples 1 to 10 was reduced as compared to the comparative example. It is conceivable that this is because in the battery according to examples 1 to 10, one of the electrodes contains the liquid electrolyte only, so that the ion conductivity in the electrode was increased, and thereby the battery resistance was reduced, as compared to the battery according to the comparative example in which both electrodes contain the high polymer gel electrolyte.

In this way, it was observed that the bipolar battery and bipolar battery manufacturing method according to the present invention serve to enhance the output density by increase in the ion conductivity, and thereby obtain a bipolar battery superior in performance.

As example 1 is compared with example 2, it is observed that when the membrane thickness and porosity of the positive negative electrodes are identical, substantially the same effect is produced if only one of the positive and negative electrodes is provided with the liquid electrolyte.

As examples 3, 4, 5 and 6 are compared with one another, it is observed that when the porosity of the positive and negative electrodes are identical, the effect of decrease in the battery resistance is higher if one having a larger membrane thickness is provided with the liquid electrolyte.

As examples 7, 8, 9 and 10 are compared with one another, it is observed that when the membrane thickness of the positive and negative electrodes are identical, the effect of decrease in the battery resistance is higher if one having a lower porosity is provided with the liquid electrolyte. As examples 1 and 2 are compared with examples 11 and 12, when the electrode has the same specifications, the same effect is obtained both in the case where the high polymer gel electrolyte is applied to the electrode, and in the case where the high polymer gel electrolyte is applied to the separator.

Other Embodiments

In the fourth embodiment, in the operation of forming the assembly unit 409, only liquid electrolyte 427 in high polymer gel electrolyte 426 applied to one electrode (positive electrode 113) is made to permeate through separator 421 to the other electrode (negative electrode 112). In is not excluded from the present invention that the polymer in the high polymer gel electrolyte passes through separator 121, but liquid electrolyte 427 in high polymer gel electrolyte 426 applied to one electrode may be made to permeate through separator 421 to the other electrode together with the polymer. Moreover, in the operation of forming the assembly unit 409, the polymer concentration of the high polymer gel electrolyte made to permeate positive electrode 113 may be differentiated from the polymer concentration of the high polymer gel electrolyte made to permeate negative electrode 112. In this way, a bipolar battery is obtained in which the polymer of the high polymer gel electrolyte is present in both of positive electrode 113 and negative electrode 112, and the polymer concentration of the high polymer gel electrolyte made to permeate positive electrode 113 is different from the polymer concentration of the high polymer gel electrolyte made to permeate negative electrode 112.

It is preferable to set lower the polymer concentration in one of positive electrode 113 and negative electrode 112 where ion diffusion is lower. This is because it is possible to enhance the output density of the battery by relatively increasing the concentration of the liquid electrolyte in the electrode where ion diffusion is lower, with respect to the concentration of the liquid electrolyte in the other electrode, and thereby increasing the ion conductivity into balance with the ion conductivity of the other electrode.

There are two manufacturing methods to specifically implement the differentiation of polymer concentration. The first method includes: mixing two or more kinds of polymers having different polymer lengths into a high polymer gel electrolyte; applying the high polymer gel electrolyte only to one surface of the bipolar electrode or separator; and causing the polymer having the shorter polymer length to permeate to the opposite side of the separator together with an electrolytic solution, by heating vacuum press. The second method includes: applying a high polymer gel electrolyte having a low polymer concentration to one surface of the bipolar electrode, and applying a high polymer gel electrolyte having a high polymer concentration to the other surface of the bipolar electrode, before a heating vacuum press operation; and performing the heating vacuum press operation after layering. In the second method, one kind of a polymer larger than the pore of the separator may be arranged on both sides of the separator, where only the concentration is differentiated, or two or more kinds of polymers may be used to differentiate the polymer concentration, as in the first method.

The invention claimed is:

1. A bipolar battery manufacturing method comprising:
preparing a bipolar electrode where a positive electrode is formed on a surface of a current collector, and a negative electrode is formed on another surface of the current collector;
preparing a porous separator that is permeable by an electrolyte;
forming a sub-assembly unit by layering the bipolar electrode, the separator, and the electrolyte so that the electrolyte is positioned only at a first surface of the separator; and
forming an assembly unit by:
layering a plurality of the sub-assembly units; and
making the electrolyte permeate through the separator to one of the positive and negative electrodes facing a second surface of the separator.

2. The bipolar battery manufacturing method as claimed in claim 1, wherein forming the sub-assembly unit includes one of:
applying the electrolyte to one of the positive and negative electrodes on which the separator is layered, before layering the separator on the bipolar electrode;
applying the electrolyte to a surface of the separator that faces the bipolar electrode, before layering the separator on the bipolar electrode; and
applying the electrolyte to an outside surface of the separator that is opposite to the surface of the separator that faces the bipolar electrode, after layering the separator on the bipolar electrode.

3. The bipolar battery manufacturing method as claimed in claim 1, wherein forming the sub-assembly unit comprises forming the sub-assembly unit such that an amount of the electrolyte is equal to a sum of:
an amount held by one of the positive and negative electrodes;
an amount provided to permeate the separator; and
an amount provided to permeate through the separator to another of the positive and negative electrodes.

4. The bipolar battery manufacturing method as claimed in claim 1, wherein forming the sub-assembly unit comprises forming the sub-assembly unit such that one of the positive and negative electrodes that is opposite to another of the positive and negative electrodes on which the separator is layered is applied beforehand with an amount of electrolyte so as to permeate the one of the positive and negative electrodes without being exposed on a surface of the one of the positive and negative electrodes.

5. The bipolar battery manufacturing method as claimed in claim 1, wherein when the electrolyte is positioned between the bipolar electrode and the separator, forming the sub-assembly unit comprises:
arranging a first seal on the current collector so that the first seal has a thickness below a sum of a thickness of one of the positive and negative electrodes and a thickness of the electrolyte and surrounds the one of the positive and negative electrodes; and
arranging a second seal on the separator so that the second seal has a thickness below a sum of a thickness of another of the positive and negative electrodes and a thickness of the electrolyte that is provided to permeate through the separator and exposed on a surface of the other of the positive and negative electrodes, and the second seal surrounds the other of the positive and negative electrodes.

6. The bipolar battery manufacturing method as claimed in claim 1, wherein when the electrolyte is positioned at an outside surface of the separator layered on the bipolar electrode, forming the sub-assembly unit comprises:
arranging a first seal on the current collector so that the first seal has a thickness below a sum of a thickness of one of the positive and negative electrodes and a thickness of the electrolyte that is provided to permeate through the separator and exposed on a surface of the one of the positive and negative electrodes, and the first seal surrounds the one of the positive and negative electrodes; and
arranging a second seal on the separator so that the second seal has a thickness below a sum of a thickness of another of the positive and negative electrodes and a thickness of the electrolyte and surrounds the other of the positive and negative electrodes.

7. The bipolar battery manufacturing method as claimed in claim 5, wherein forming the assembly unit comprises pressing the first and second seals in a direction in which the plurality of sub-assembly units are layered, so as to bring the current collector, the separator, and the first and second seals in tight contact, and
wherein a sealing part is thereby formed that is configured to prevent the electrolyte from leaking.

8. The bipolar battery manufacturing method as claimed in claim 1, wherein forming the assembly unit comprises heating the plurality of layered sub-assembly units.

9. The bipolar battery manufacturing method as claimed in claim 1, wherein forming the assembly unit comprises forming an electrolyte layer which includes:
a first layer containing an electrolyte that conducts ions between the separator and one of the positive and negative electrodes;
a second layer where an electrolyte is provided to permeate the separator; and
a third layer containing an electrolyte that conducts ions between the separator and another of the positive and negative electrodes.

10. The bipolar battery manufacturing method as claimed in claim 1, wherein:
the electrolyte is a polymer gel electrolyte; and
forming the assembly unit comprises providing a liquid electrolyte in the polymer gel electrolyte to permeate through the separator to one of the positive and negative electrodes facing the second surface of the separator.

11. The bipolar battery manufacturing method as claimed in claim 10, wherein one of the positive and negative electrodes in which ion diffusion is lower than in another of the positive and negative electrodes is permeated only by the liquid electrolyte.

12. The bipolar battery manufacturing method as claimed in claim 1, wherein:
the electrolyte is a polymer gel electrolyte; and
forming the assembly unit comprises setting a polymer gel electrolyte provided to permeate the positive electrode and a polymer gel electrolyte provided to permeate the negative electrode to differ in a polymer concentration.

13. The bipolar battery manufacturing method as claimed in claim 12, wherein the polymer concentration in one of the positive and negative electrodes in which ion diffusion is lower than in another of the positive and negative electrodes is set lower than in the other of the positive and negative electrodes.

14. The bipolar battery manufacturing method as claimed in claim 10, wherein:
  a polymer in the polymer gel electrolyte is thermoplastic; and
  in forming the assembly unit, the plurality of layered sub-assembly units are heated.

* * * * *